(12) United States Patent
Sakamoto et al.

(10) Patent No.: US 9,097,954 B2
(45) Date of Patent: Aug. 4, 2015

(54) LIQUID CRYSTAL DISPLAY SUBSTRATE AND LIQUID CRYSTAL DISPLAY DEVICE

(71) Applicant: TOPPAN PRINTING CO., LTD., Tokyo (JP)

(72) Inventors: Taro Sakamoto, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 13/912,958

(22) Filed: Jun. 7, 2013

(65) Prior Publication Data

US 2013/0271707 A1    Oct. 17, 2013

Related U.S. Application Data

(63) Continuation of application No. PCT/JP2011/066461, filed on Jul. 20, 2011.

(30) Foreign Application Priority Data

Dec. 10, 2010    (JP) .................................. 2010-275849

(51) Int. Cl.
*G02F 1/1343*    (2006.01)
*G02F 1/139*    (2006.01)
(Continued)

(52) U.S. Cl.
CPC .......... *G02F 1/139* (2013.01); *G02F 1/133707* (2013.01); *G02F 1/134309* (2013.01);
(Continued)

(58) Field of Classification Search
CPC . G02F 1/133707; G02F 1/139; G02F 1/1343; G02F 1/13439; G02F 1/134363; G02F 1/134309; G02F 1/134336; G02F 2001/134345; G02F 2001/134372; G02F 1/1393; G02F 2001/134318
USPC .......................................... 349/141, 106, 139
See application file for complete search history.

(56) References Cited

U.S. PATENT DOCUMENTS 5,754,266 A * 5/1998 Ohta et al. ..................... 349/139
6,104,459 A * 8/2000 Oike et al. ..................... 349/105
(Continued)

FOREIGN PATENT DOCUMENTS

JP    5-26161    2/1993
JP    07013164 A    1/1995
(Continued)

OTHER PUBLICATIONS

English translation of JP JP 2009237554, Author: Rakeda et al., Title: Electro-Optical Element and Display Device; Date: Oct. 15, 2009.*
(Continued)

*Primary Examiner* — Edward Glick
*Assistant Examiner* — Shan Liu

(57) ABSTRACT

In a liquid crystal display substrate, the array substrate includes comb-shaped first and second electrodes. The counter substrate faces the array substrate via a liquid crystal layer and includes a comb-shaped third electrode. In a cross-section perpendicular to the first through third longitudinal directions, comb teeth of the first and second electrodes have a positional relationship in which one is shifted from the other in a first horizontal direction. Comb teeth of the first and third electrodes have a positional relationship in which one is shifted from the other in a second horizontal direction which is opposite to the first horizontal direction.

10 Claims, 18 Drawing Sheets

(51) Int. Cl.
  *G02F 1/1337*  (2006.01)
  *G02F 1/137*  (2006.01)

(52) U.S. Cl.
  CPC ............... *G02F2001/13712* (2013.01); *G02F 2001/133742* (2013.01); *G02F 2001/134318* (2013.01); *G02F 2001/134381* (2013.01); *G02F 2201/40* (2013.01)

(56) References Cited

U.S. PATENT DOCUMENTS

| | | | | |
|---|---|---|---|---|
| 6,111,627 | A | * | 8/2000 | Kim et al. ............... 349/141 |
| 7,796,226 | B2 | * | 9/2010 | Yamada et al. ............ 349/141 |
| 2002/0176043 | A1 | * | 11/2002 | Fukami et al. ............ 349/141 |
| 2004/0004690 | A1 | * | 1/2004 | Yamaguchi et al. ......... 349/141 |
| 2006/0066791 | A1 | * | 3/2006 | Mizusako et al. .......... 349/123 |
| 2009/0109356 | A1 | * | 4/2009 | Kitagawa ................. 349/33 |
| 2010/0091231 | A1 | * | 4/2010 | Nishimura et al. ......... 349/139 |

FOREIGN PATENT DOCUMENTS

| | | |
|---|---|---|
| JP | 9-244046 | 9/1997 |
| JP | 10-39128 | 2/1998 |
| JP | 10-48652 | 2/1998 |
| JP | 2000-81641 | 3/2000 |
| JP | 2000-081641 A | 3/2000 |
| JP | 2000-155317 A | 6/2000 |
| JP | 2007-072477 | 3/2007 |
| JP | 2008-181139 | 8/2008 |
| JP | 2009-105424 | 5/2009 |
| JP | 2009-237554 | 10/2009 |
| JP | 2009237554 A * | 10/2009 |

OTHER PUBLICATIONS

International Search Report mailed Oct. 11, 2011 corresponding to International Application PCT/JP2011/066461.

PCT International Preliminary Report on Patentability mailed Jun. 20, 2013 in corresponding International Application No. PCT/JP2011/066461.

* cited by examiner

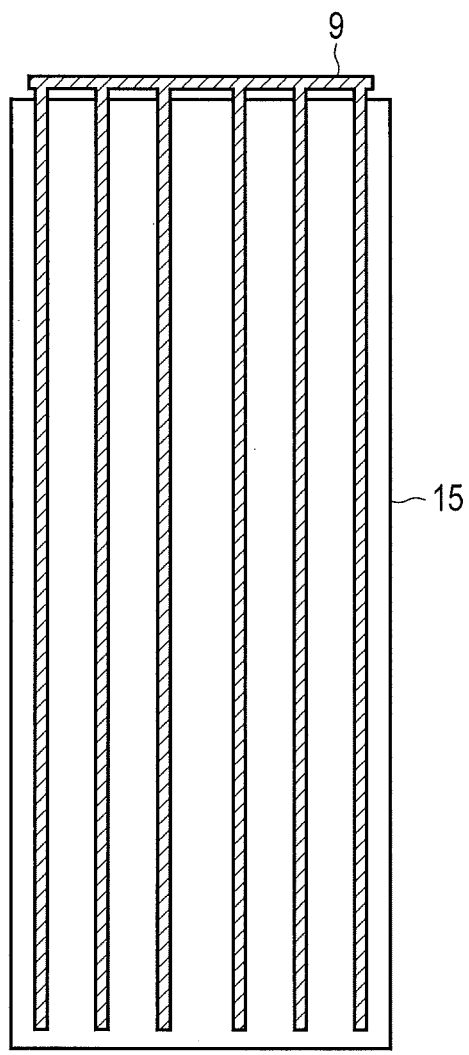
F I G. 9

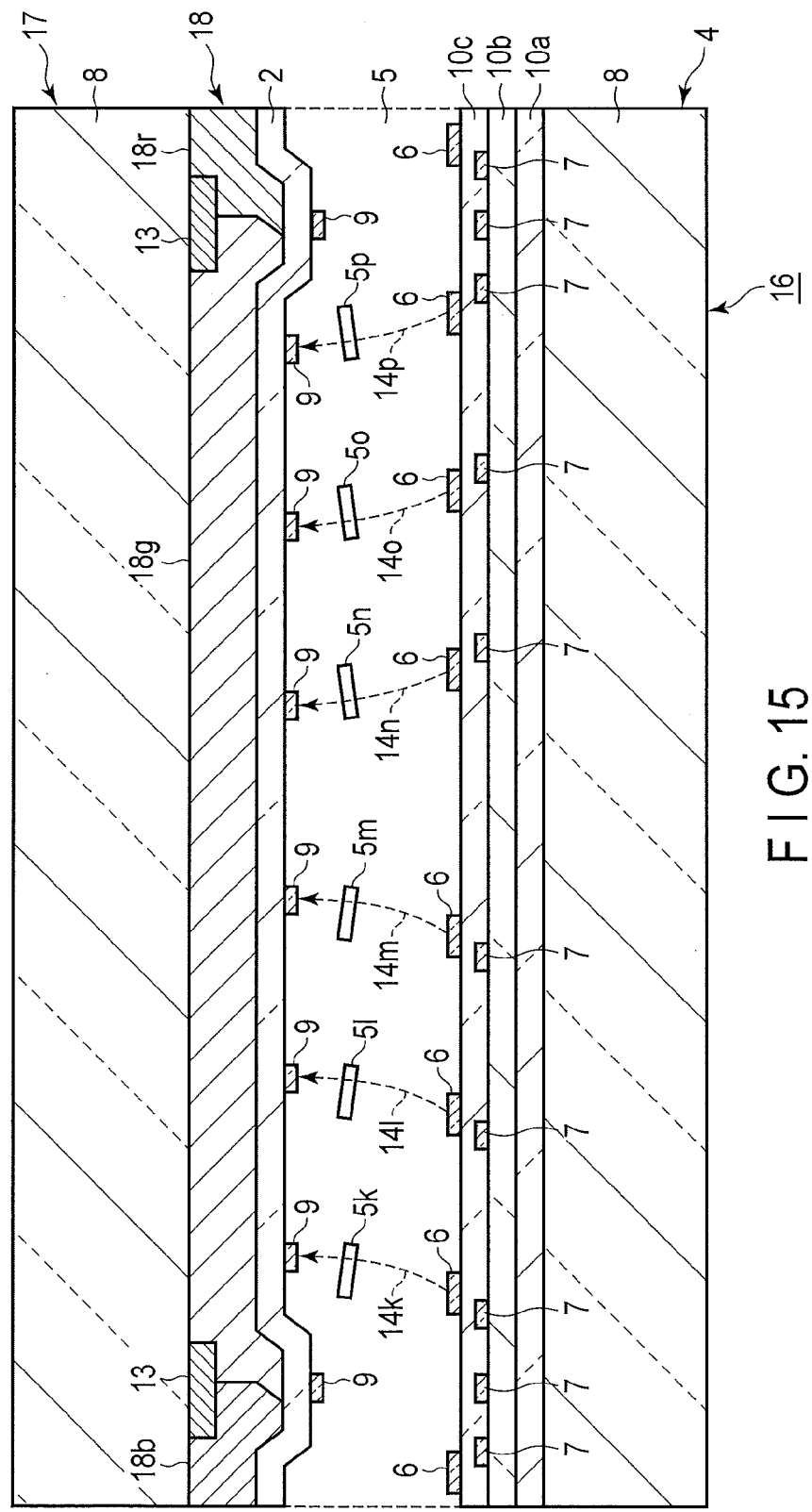
F I G. 15

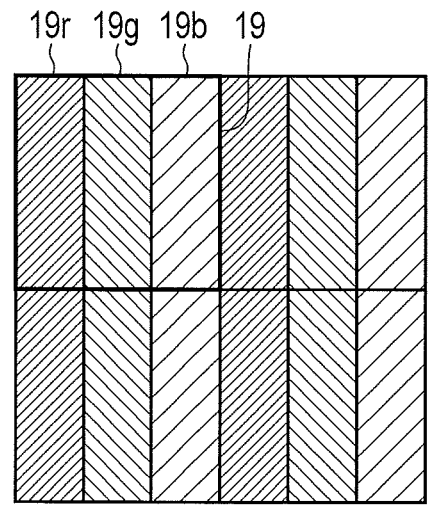
F I G. 16
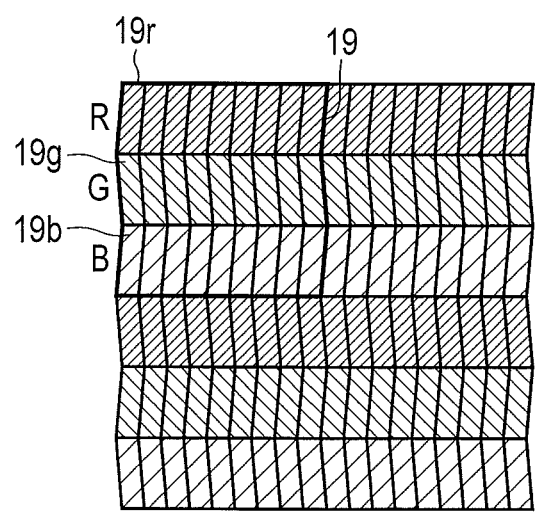
F I G. 17

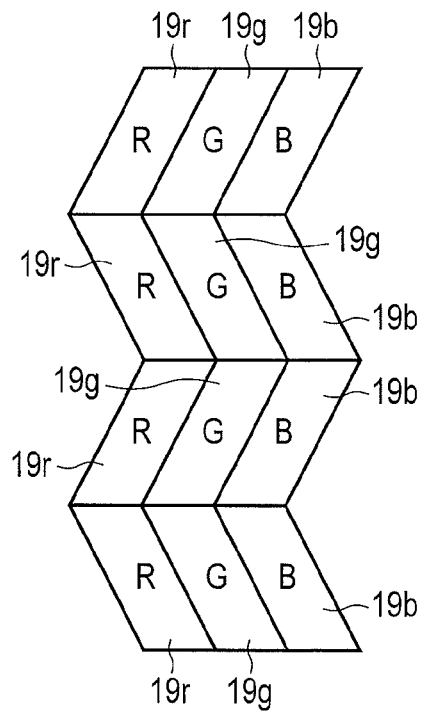
F I G. 18
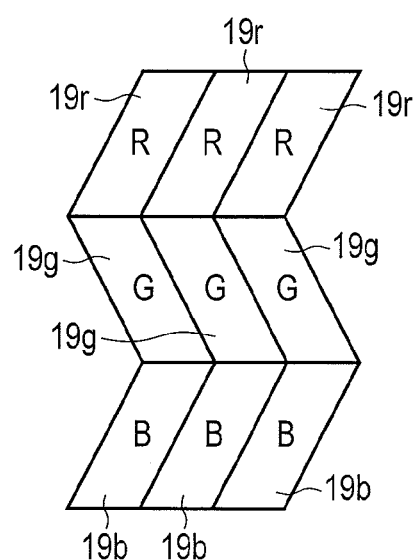
F I G. 19

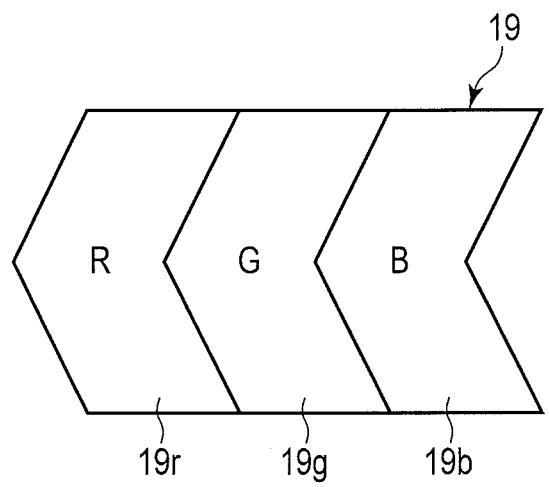
F I G. 20
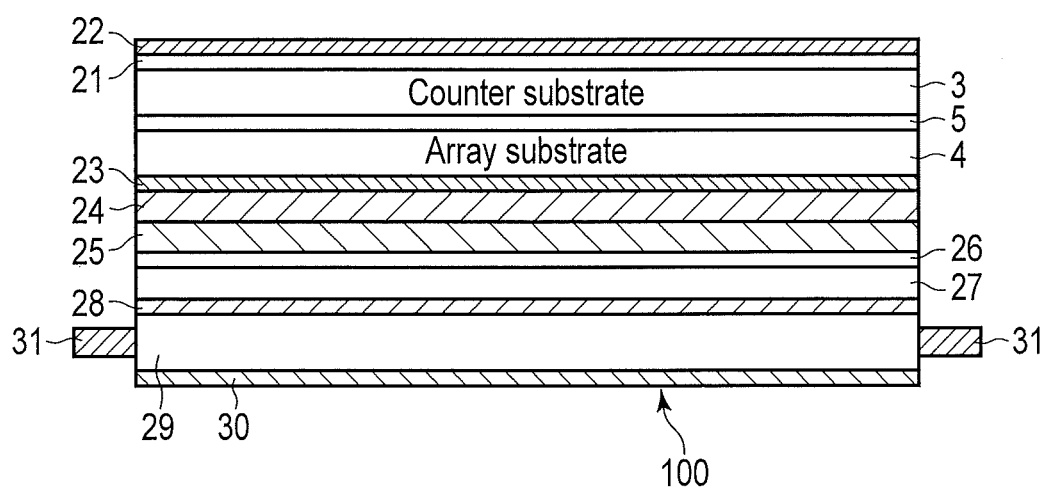
F I G. 21

LIQUID CRYSTAL DISPLAY SUBSTRATE AND LIQUID CRYSTAL DISPLAY DEVICE

CROSS REFERENCE TO RELATED APPLICATIONS

This application is a Continuation application of PCT Application No. PCT/JP2011/066461, filed Jul. 20, 2011 and based upon and claiming the benefit of priority from prior Japanese Patent Application No. 2010-275849, filed Dec. 10, 2010, the entire contents of all of which are incorporated herein by reference.

BACKGROUND OF THE INVENTION

1. Field of the Invention

An embodiment of the present invention relate to a liquid crystal display substrate, and a liquid crystal display device including the liquid crystal display substrate.

2. Description of the Related Art

In regard to a thin display device such as a liquid crystal display device, there has been a demand for an enhancement of image quality, price reduction, and electric power saving. A color filter for the liquid crystal display device is required to have sufficient color purity, high contrast, flatness and the like for the purpose of display with high image quality.

Regarding an alignment mode of liquid crystals or a liquid crystal driving system that is applied to the liquid crystal display device with high image quality, VA (Vertical Alignment), HAN (Hybrid-aligned Nematic), TN (Twisted Nematic), OCB (Optically Compensated Bend), CPA (Continuous Pinwheel Alignment) and the like have been suggested. When such an alignment mode of liquid crystals and liquid crystal driving system are used, a display device with wide viewing angle and high-speed response is realized.

In the VA mode, liquid crystals are aligned in vertical to a surface of a substrate such as glass. This VA mode is effective in the realization of high viewing angle and high speed response. The HAN mode is effective in the realization of high viewing angle. In the liquid crystal display device such as the VA mode and HAN mode, high level of flatness (uniformity of film thickness or a reduction of surface asperities of a color filter surface) and an electrical characteristic such as dielectric constant are required for a color filter. In a liquid crystal display device with high image quality, due to a decrease in coloration upon diagonal viewing, a technology of making a liquid crystal cell thickness (thickness of the liquid crystal layer) small is important. In regard to the VA mode, the development of various improved modes such as MVA (Multi-Domain Vertical Alignment), PVA (Patterned Vertical Alignment), VAECB (Vertical Alignment Electrically Controlled Birefringence), VAHAN (Vertical Alignment Hybrid-Aligned Nematic) and VATN (Vertical Alignment Twisted Nematic) is underway. Furthermore, in a liquid crystal display device of a longitudinal electric field mode in which a driving voltage is applied in a thickness direction of the liquid crystals, such as the VA mode, it is desirable to realize higher speed response of liquid crystals, a wider viewing angle, and a higher transmittance. In a conventional liquid crystal display device, when a voltage is applied to liquid crystals that are initially vertical to the substrate surface, a direction in which the liquid crystals would tilt is not easily determined, and vertically aligned liquid crystals may become unstable upon an application of a liquid crystal driving voltage. In order to avoid that vertically aligned liquid crystals become unstable as such, in the MVA technology, plural slit-like convex areas are provided, and liquid crystal domains are formed between these slits so as to have plural directions of alignment. Thereby, in the MVA technology, a wide viewing angle is secured.

Patent Literature 1 (Japanese Patent No. 3957430) discloses a technology for forming a liquid crystal domain by using a first and a second alignment regulating structure (slit).

Patent Literature 2 (Jpn. Pat. Appln. KOKAI Publication No. 2008-181139) discloses a technology for forming four liquid crystal domains by using photo-alignment. In this Patent Literature 2, it is disclosed that in order to secure a wide viewing angle, multiple alignment treatments related to strict control of the tilt angle (89°) and plural alignment axes that respectively differ by 90° are needed at each of the domains.

Patent Literature 3 (Japanese Patent No. 2859093) and Patent Literature 4 (Japanese Patent No. 4364332) disclose a technology for controlling liquid crystals that are vertically aligned by an oblique electric field by a transparent conductive film (a transparent electrode, a display electrode or a third electrode) of a color filter substrate side and a first electrode and a second electrode of an array substrate side. In the Patent Literature 3, liquid crystals having negative dielectric constant anisotropy are used. In Patent Literature 4, liquid crystals having positive dielectric constant anisotropy are described. Meanwhile, Patent Literature 4 describes nothing about liquid crystals having negative dielectric constant anisotropy.

Usually, in a basic configuration of the liquid crystal display device of VA mode, TN mode or the like, the liquid crystals are sandwiched by a color filter substrate equipped with a common electrode, and an array substrate with plural pixel electrodes that drive liquid crystals (for example, transparent electrodes that are electrically connected to TFT elements and are formed in a comb-shaped pattern). In this configuration, a driving voltage is applied between the common electrode above the color filter and the pixel electrodes formed for the array substrate side, and liquid crystals are driven by the application of this driving voltage. As the transparent conductive film that is used as the pixel electrode or the common electrode of the color filter surface, a thin film of an electroconductive metal oxide such as ITO (indium tin oxide), IZO (indium zinc oxide) or IGZO (indium gallium zinc oxide) is usually used.

Patent Literature 5 (Jpn. Pat. Appln. KOKAI Publication No. 10-39128) discloses a color filter which includes blue pixels, green pixels, red pixels, a black matrix, and the like. In this Patent Literature 5, for example, while a black matrix is formed, a transparent conductive film is also formed above the color pixels, and an overcoat is further laminated thereon.

A technology of forming the cross-section of the black matrix into a trapezoidal shape is disclosed in the Patent Literature 3. In the Patent Literature 4 (for example, FIGS. 7 and 9), a technology of using plural stripe electrodes and liquid crystals having positive dielectric constant anisotropy is disclosed. In this Patent Literature 4, a color filter is formed above a transparent electrode (transparent conductive film).

Patent Literature 6 (Jpn. Pat. Appln. KOKAI Publication No. 5-26161) discloses a technology of forming a color filter above a transparent conductive film.

As explained above, in a vertically alignment liquid crystal display device employing the MVA technology, domains of liquid crystals are formed by alignment regulating structures called slits, in order to secure a wide viewing angle. When the liquid crystals have positive dielectric constant anisotropy, the liquid crystals located between two slits made of a resin that are formed above the color filter or the like tilt upon the application of a driving voltage, for example, in a direction perpendicular to these slits as viewed in a planar view, and the liquid crystals, except for the liquid crystals at a center between the two slits, move to line up horizontally above the substrate surface. However, the liquid crystals at the center between the two slits do not have the direction of tilt definitively determined despite the voltage application, and may be in a spray alignment or bend alignment state. Such alignment disorder of liquid crystals may cause a rough texture in the liquid crystal display or display unevenness. In the case of the MVA mode, in addition to the problems described above, it is difficult to finely control the amount of tilt of the liquid crystals by means of the driving voltage, and it is difficult to achieve a half-tone display satisfactorily. Particularly, the linearity in the relationship between the driving voltage and the display (response time) is low, and it is difficult to achieve a half-tone display satisfactorily with a low driving voltage.

In order to solve such problems, as disclosed in Patent Literature 3 or Patent Literature 4, a technique of controlling the liquid crystal alignment with an oblique electric field by using first, second and third electrodes is effective. The direction of tilt of the liquid crystals can be set by the oblique electric field. Furthermore, it becomes easy to control the amount of tilt of the liquid crystals by the oblique electric field, and a half-tone display can be achieved satisfactorily.

However, there are occasions in which even if these technologies are used, the measures for disclination of liquid crystals are unsatisfactory. Disclination means that regions with different light transmittances occur within a pixel due to unintended alignment disorder or non-alignment of liquid crystals. Here, the pixel is the smallest unit of liquid crystal display.

In the Patent Literature 3, due to the fixing of disclination at the center of the pixel, an alignment control window where there is no transparent conductive film at the center of the pixel of a counter electrode (third electrode) is provided. However, Patent Literature 3 does not disclose any remedial measures for disclination in the periphery of the pixel. Furthermore, in the Patent Literature 3, fixing of disclination at the center of the pixel is enabled, but no investigation was conducted regarding the measures to minimize disclination. Furthermore, Patent Literature 3 does not describe any technology for improving the responsiveness of liquid crystals.

Patent Literature 2 discloses that strict control of the tilt angle of liquid crystals to 89 degrees and four times of alignment treatments are required in order to secure a wide viewing angle.

In Patent Literature 4, when a dielectric layer is laminated above a transparent conductive film (transparent electrode), the effect of the oblique electric field is enhanced, and preferable results are obtained. However, as shown in FIG. 7 of Patent Literature 4, there are occasions in which vertically aligned liquid crystals remain at the center of the pixel and the edges of the pixel even after voltage application, and the transmittance or numerical aperture decreases. Also, in regard to Patent Literature 4, in the case of using liquid crystals having positive dielectric constant anisotropy, it is difficult to increase the transmittance due to disclination at the center of the pixel. Meanwhile, in Patent Literature 4, no investigation was conducted on liquid crystals having negative dielectric constant anisotropy.

BRIEF SUMMARY OF THE INVENTION

Technical Problem

It is an object of an embodiment of the present invention to provide a liquid crystal display substrate which has reduced disclination, is bright, has satisfactory responsiveness, and is adequate for driving of liquid crystals by an oblique electric field, and a liquid crystal display device equipped with the substrate.

Solution to the Problems

According to an embodiment, a liquid crystal display substrate and device includes an array substrate, a liquid crystal layer, and a counter substrate. The array substrate includes a comb-shaped first electrode, which is a pixel electrode, and a comb-shaped second electrode, a first longitudinal direction of comb teeth of the first electrode and a second longitudinal direction of comb teeth of the second electrode being parallel to each other, and the array substrate being partitioned into pixel units or sub-pixel units. The counter substrate faces the array substrate via the liquid crystal layer and includes a comb-shaped third electrode, the first longitudinal direction and a third longitudinal direction of comb teeth of the third electrode being parallel to each other, and the counter substrate being partitioned into the pixel units or the sub-pixel units. In a cross-section perpendicular to the first through third longitudinal directions, the comb teeth of the first electrode and the comb teeth of the second electrode have a first positional relationship in which one is shifted from the other in a first horizontal direction that is parallel to a substrate plane. In the cross-section, the comb teeth of the first electrode and the comb teeth of the third electrode have a second positional relationship in which one is shifted from the other in a second horizontal direction which is a direction opposite to the first horizontal direction.

Advantageous Effects of Invention

According to the present invention, a liquid crystal display substrate which has reduced disclination, is bright, has satisfactory responsiveness, and is adequate for driving of liquid crystals by an oblique electric field, and a liquid crystal display device equipped with the substrate can be provided.

BRIEF DESCRIPTION OF THE SEVERAL VIEWS OF THE DRAWING

FIG. 9 is a top plan view illustrating a first example of a third electrode.

FIG. 15 is a partial cross-sectional diagram illustrating an example of the pixel after a lapse of a predetermined time from the application of the driving voltage according to the second embodiment.

FIG. 16 is a top plan view illustrating an example of a pixel including three sub-pixels.

FIG. 17 is a top plan view illustrating an example of a pixel including plural sub-pixels each having a polygonal shape in which opposite sides are parallel to each other.

FIG. 18 is a top plan view illustrating an example of a pixel in a longitudinal stripe arrangement including plural parallelogram-shaped sub-pixels.

FIG. 19 is a top plan view illustrating an example of a pixel in a lateral stripe arrangement including plural parallelogram-shaped sub-pixels.

FIG. 20 is a top plan view illustrating an example of "<"-shaped sub-pixels and pixels.

FIG. 21 is a cross-sectional diagram illustrating an example of the configuration of a liquid crystal display device according to a sixth embodiment.

DETAILED DESCRIPTION OF THE INVENTION

Hereinafter, embodiments of the present invention will be described while making reference to the drawings. In the following descriptions, the same or substantially the same functions and constituent elements will be assigned with the same symbol, and explanations will be appropriately given as needed.

First Embodiment

In the present embodiment, a liquid crystal display substrate which is adequate for liquid crystal driving based on an oblique electric field that is generated by a first electrode which is a pixel electrode of an array substrate equipped with an active element such as a thin film transistor (hereinafter, referred to as a TFT (Thin Film Transistor)), a second electrode of the array substrate, and a third electrode provided on a counter substrate; and a liquid crystal display device equipped with this liquid crystal display substrate, will be explained.

Meanwhile, a TFT may be formed by, for example, using a silicon semiconductor, or may be formed by using a complex metal-oxides semiconductor. When a TFT is formed by using the complex metal-oxides semiconductor, the aperture ratio of pixels or sub-pixels can be increased. Regarding a representative channel material for a TFT formed by using the complex metal-oxides semiconductor, for example, a complex metal-oxides of indium, gallium, and zinc, which is called IGZO, is used.

Figure 1:
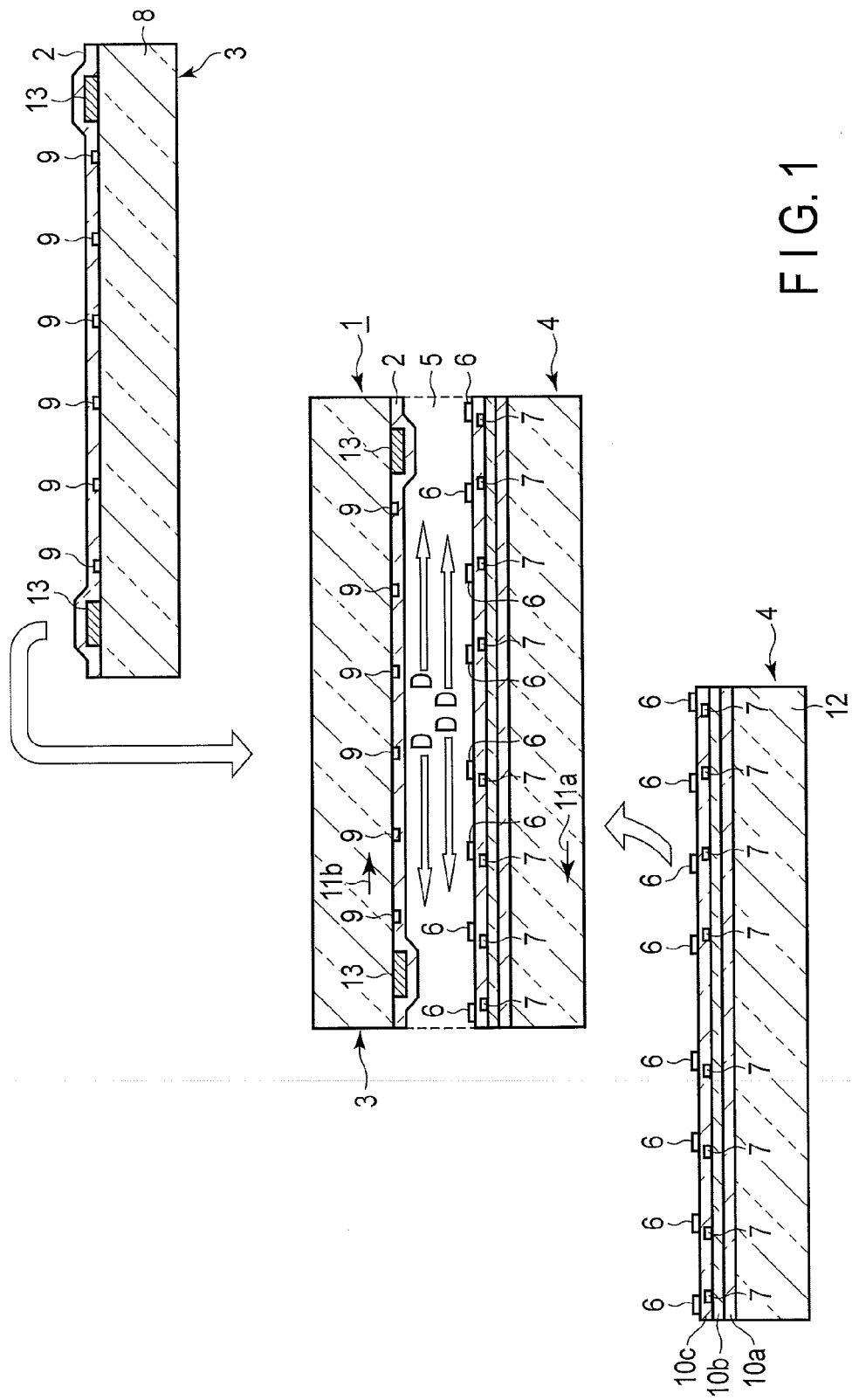
FIG. 1 is a partial cross-sectional diagram illustrating a first example of a liquid crystal display substrate according to a first embodiment.

FIG. 1 is a partial cross-sectional diagram illustrating a first example of a liquid crystal display substrate according to the present embodiment. This FIG. 1 illustrates an example of the cross-section of a pixel. A pixel (for example, a rectangular pixel) may include plural sub-pixels.

In a substrate 1 of the liquid crystal display device according to the present embodiment, a counter substrate 3 which has a resin layer 2 formed above the surface and may or may not include plural color filters (color pixels), faces an array substrate 4 for which a liquid crystal driving element such as a TFT is formed. The counter substrate 3 and the array substrate 4 that face each other are sealed together, with a liquid crystal layer 5 interposed therebetween. The plane of the counter substrate 3 and the plane of the array substrate 4 are respectively partitioned into pixel units or sub-pixel units.

Furthermore, the substrate 1 according to the present embodiment has a tripolar electrode structure including a first electrode 6, which is a pixel electrode, a second electrode 7 having a potential different from that of the first electrode at the time of driving the liquid crystals, and a third electrode 9 which is formed on a substrate (transparent substrate) 8 of the counter substrate 3 by using a transparent conductive film or the like. The liquid crystal display device equipped with the substrate 1 employs an oblique electric field technology based on a tripolar electrode structure.

The first electrode 6 is electrically connected to an active element such as a TFT, and is formed in a comb-shaped pattern (may also be in a stripe form).

The second electrode 7 and the third electrode 9 are formed in a comb-shaped pattern, similarly to the first electrode. One or both of the second electrode 7 and the third electrode 9 may be made into a common electrode (common). In FIG. 1, vertical cross-sections in the axial direction of the comb teeth (for example, the longitudinal direction of the comb teeth, or simply the comb teeth direction) of the first through third electrodes 6, 7 and 9 are depicted. Here, the longitudinal direction of the comb teeth means, for example, the longitudinal direction of linear conductive sections of the first electrode 6, the second electrode 7, and the third electrode 9 when the array substrate 4 or the counter substrate 3 is viewed in a planar view. Above the surface of a substrate (transparent substrate) 12 of the array substrate 4, insulating layers 10a are 10b are formed. Above the insulating layer 10b, the second electrode 7 is formed. Above the second electrode 7, an insulating layer 10c is formed. Above the insulating layer 10c, the first electrode 6 is formed. The first electrode 6 and the second electrode 7 are electrically insulated by the insulating layer 10c in the direction in which the array substrate 4 and the counter substrate 3 face each other (may be the thickness direction, the height direction, the vertical direction, or the lamination direction). When the insulating layer 10c is formed of SiNx (silicon nitride), a practical range of the film thickness of the insulating layer 10c is, for example, from 0.1 μm to 0.5 μm.

In the present embodiment, for example, the number of comb teeth of the third electrode 9 for every pixel or sub-pixel may be larger than the number of the comb teeth of the first electrode 6. The total area of the comb teeth of the third electrode 9 for every pixel or sub-pixel may be larger than the total area of the comb teeth of the first electrode 6. The first electrode 6, the second electrode 7, and the third electrode 9 can be formed as conductive films that are transparent to the visible region. The density, pitch, and electrode width of the comb teeth of the electrodes 6, 7 and 9 may be respectively appropriately adjusted within the pixel or the sub-pixel. It is important to form the respective electrodes 6, 7 and 9 at positions symmetrical about the central axis of the pixel in a cross-sectional view of the pixel or the sub-pixel, from the view point of securing a wide viewing angle of the liquid crystal display. In order to form the respective electrodes 6, 7 and 9 at positions symmetrical about the central axis of the pixel, it is necessary that the number of comb teeth of each of the electrodes 6, 7 and 9 in a cross-sectional view be an even number of 2 or more for a pixel or sub-pixel.

Furthermore, in the present embodiment, the first electrode 6, the second electrode 7, and the third electrode 9 are disposed in a state of facing one another. In the present embodiment, the longitudinal direction of the comb teeth of the first electrode 6 and the longitudinal direction of the comb teeth of the second and third electrodes 7 and 9 are almost parallel to each other. Further, in the present embodiment, the alignment position of the comb teeth of the first electrode 6 and the alignment position of the comb teeth of the second electrode 7 that face each other, are in a positional relationship of being shifted in a first direction 11a from a position in a horizontal direction (a direction parallel to the surfaces of the substrates 8 and 12) that is perpendicular to the counter direction. In addition, the alignment position of the comb teeth of the first electrode 6 and the alignment position of the comb teeth of the third electrode 9 that face each other, are in a positional relationship of being shifted in a second direction 11b that is opposite to the first direction 11a at a position in the horizontal direction. In other words, the comb teeth of the second electrode 7 and the comb teeth of the third electrode 9 are in a positional relationship of being shifted in the opposite direction with respect to the comb teeth of the first electrode 6. In FIG. 1, the first direction 11a is a direction facing toward an edge of the pixel from the center of the pixel, and the comb teeth of the second electrode 7 are shifted in the first direction 11a with respect to the comb teeth of the first electrode 6. The second direction 11b is a direction facing toward the center of the pixel from an edge of the pixel, and the comb teeth of the third electrode 9 are shifted in the second direction 11b with respect to the comb teeth of the first electrode 6. The first through third electrodes 6, 7 and 9 are formed symmetrically about the central axis of the cross-section of the pixel in the horizontal direction. By including the first through third electrodes 6, 7 and 9, the liquid crystal display device according to the present embodiment is capable of driving liquid crystals with high efficiency.

A black matrix 13 having openings for transmitting light in the facing direction, is formed above the substrate 8 of the counter substrate 3, and the comb teeth part of the third electrode 9 is disposed for plural openings of black matrix 13 above the substrate 8.

The black matrix 13 has a shape in which, for example, facing sides are parallel to each other, and is formed into a rectangular shape, for example.

Figure 2:
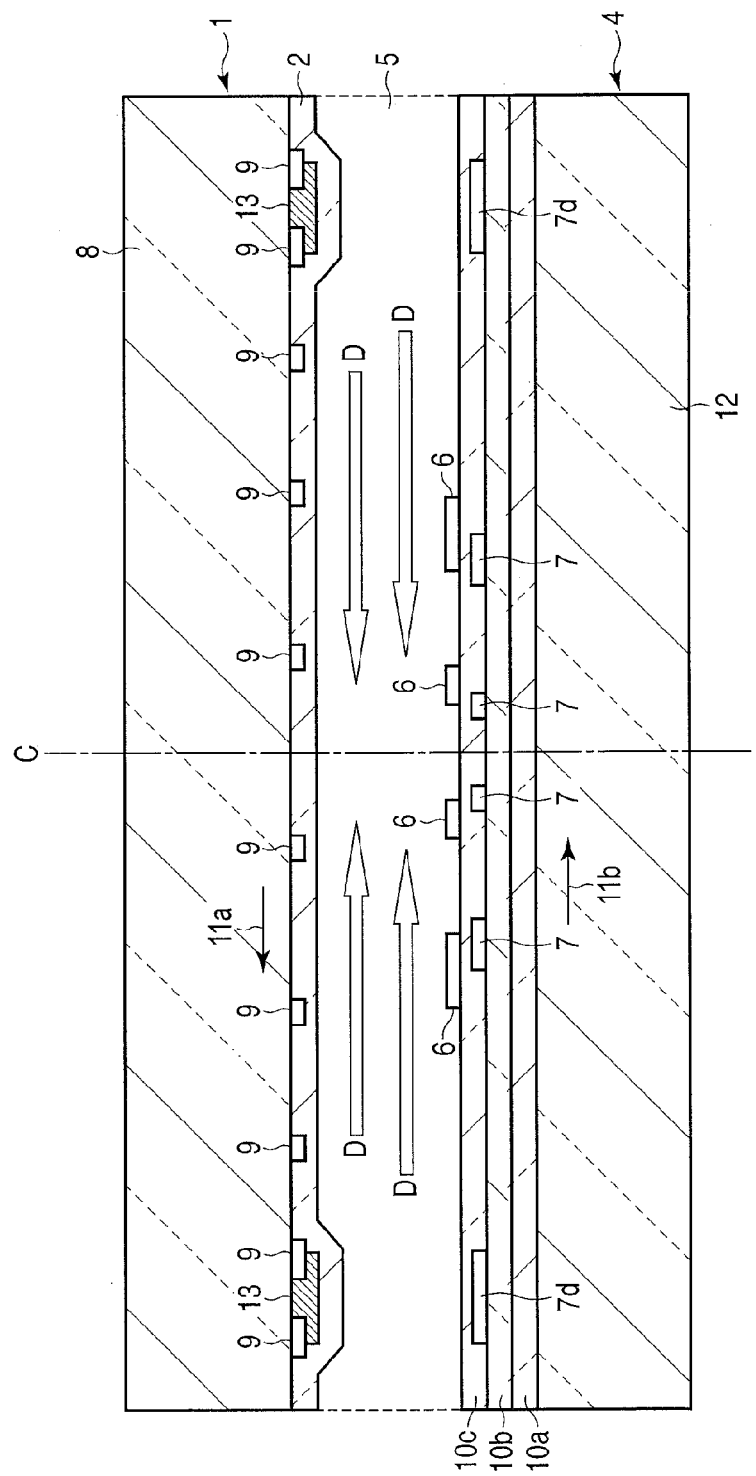
FIG. 2 is a partial cross-sectional diagram illustrating a second example of a liquid crystal display substrate according to a first embodiment.

FIG. 2 is a partial cross-sectional diagram illustrating a second example of the liquid crystal display substrate 1 according to the present embodiment. A pixel or a sub-pixel is a minimum unit of the liquid crystal display. This FIG. 2 illustrates a vertical cross-section cut along the longitudinal direction of the comb teeth provided to the first through third electrodes 6, 7 and 9.

In this FIG. 2, at least one layer (two layers in FIG. 2) of the insulating layers 10a and 10b is formed above a first surface of the array substrate 4. The second electrode 7 is formed at a particular position above the insulating layer 10b. At least one layer of the insulating layer 10c is formed above the insulating layer 10b formed on the second electrode 7. The first electrode 6 is formed at a particular position above an insulating layer 10c.

The liquid crystal layer 5 is formed above the insulating layer 10c and the first electrode 6.

A transparent resin layer 2 is disposed on the liquid crystal layer 5. Above the transparent resin layer 2, the black matrix 13 having openings and the third electrode 9 provided inside this black matrix are disposed at a particular position above the top surface (reverse side of the liquid crystal layer 5). In the present embodiment, the black matrix 13 is disposed at both ends in the horizontal direction of the cross-section of the pixel shown in FIG. 2.

Above the transparent resin layer 2, the third electrode 9 and the black matrix 13, the substrate 8 is disposed.

In FIG. 2, the third electrodes 9 are disposed on the surface on the liquid crystal layer 5 side of the substrate 8 to be symmetrical about the central axis C of the cross-section of the pixel. Above the substrate 12 of the array substrate 4, the second electrode 7 is disposed with the insulating layers 10a and 10b interposed therebetween. Furthermore, the first electrode 6 is disposed with the insulating layer 10c interposed therebetween. The second electrode 7 shown in FIG. 2 includes a section 7d having the same width as that of the black matrix 13 at a position below the black matrix 13 and on the side of the array substrate 4 as viewed in a planar view. In the second electrode 7, by applying a common potential to the section 7d located below the black matrix 13 in a planar view, the crosstalk between adjacent pixels or adjacent sub-pixels can be mitigated.

In FIG. 2, the first electrode 6 and the second electrode 7 are symmetrically formed about the central axis C of the cross-section of the pixel in the horizontal direction. The comb teeth of the second electrode 7 are shifted from the comb teeth of the first electrode 6 in the second direction 11b. The comb teeth of the third electrode 9 are shifted from the comb teeth of the first electrode 6 in the first direction 11a.

In FIGS. 1 and 2, alignment films which are disposed above the substrate 8 of the counter substrate 3 and above the substrate 12 of the array substrate 4, and polarizing plates which are provided on both surfaces of the substrate 1 are not illustrated. The liquid crystal layer 5 has negative dielectric constant anisotropy, and includes liquid crystal molecules which are vertically aligned in an initial state. The vertically-aligned liquid crystal layer 5 is interposed between the counter substrate 3 and the array substrate 4. In FIGS. 1 and 2, the arrow denoted with D represents a direction of tilt of liquid crystals. For example, in the liquid crystal layer 5 of FIG. 1, the axis of the liquid crystal molecules (in the longitudinal direction or the long axis direction) tilts in the first direction 11a at the time of applying a driving voltage, and thus transmission display can be made. For example, in the liquid crystal layer 5 of FIG. 2, the axis of the liquid crystal molecules tilts in the second direction 11b at the time of applying the driving voltage, and thus the transmission display can be made.

Figure 3:
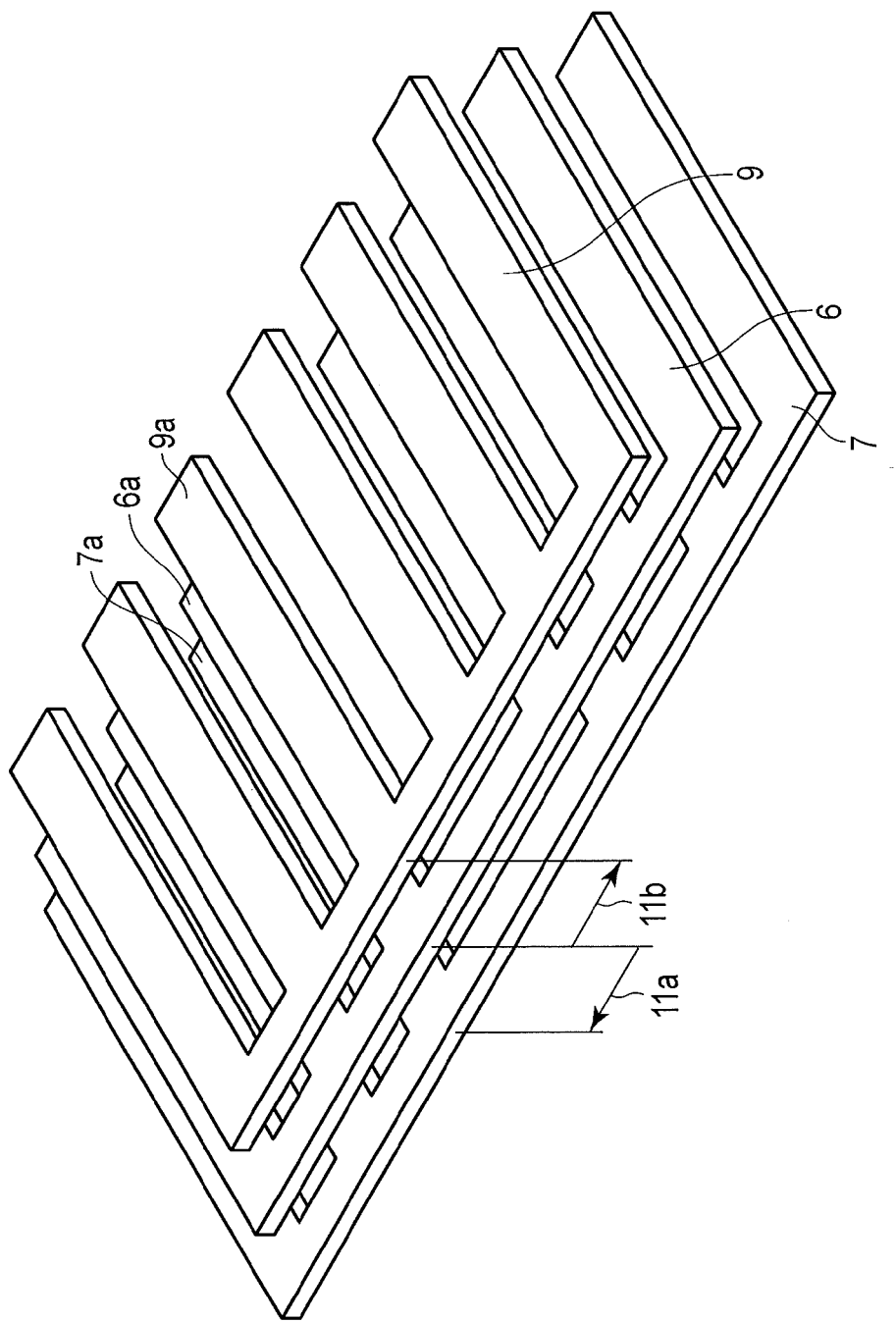
FIG. 3 is a perspective view illustrating an example of a disposition of first through third electrodes.

FIG. 3 is a perspective view illustrating an exemplary arrangement of the first through third electrodes 6, 7 and 9.

The position of any comb teeth 7a of the second electrode 7 in the horizontal direction is shifted in the first direction 11a from the position of the comb teeth 6a of the first electrode 6 corresponding to the comb teeth 7a of the second electrode 7 in the horizontal direction.

The position of any comb teeth 9a of the third electrode 9 in the horizontal direction is shifted in the second direction 11b from the position of the comb teeth 6a of the first electrode 6 corresponding to the comb teeth 9a of the third electrode 9.

The first direction 11a and the second direction 11b are opposite to each other.

Hereinbelow, the driving of the liquid crystals included in the liquid crystal layer 5 will be described in more detail by using FIGS. 4, 5 and 6 which illustrate the cross-section of a half of a pixel.

Figure 4:
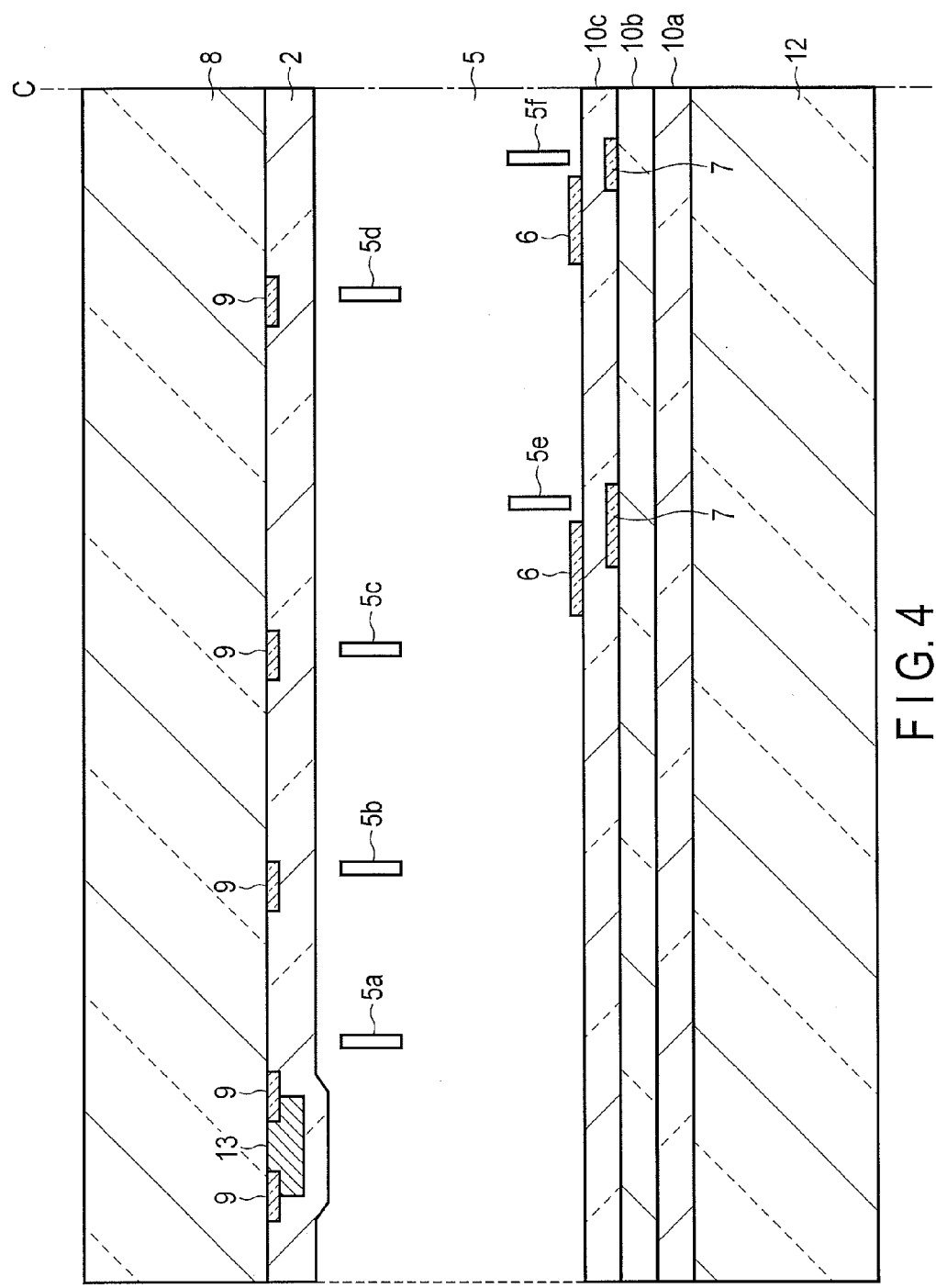
FIG. 4 is a partial cross-sectional diagram illustrating an example of a pixel on a left-hand side from a central axis C under no application of a driving voltage.

FIG. 4 is a partial cross-sectional diagram illustrating an example of pixels on the left-hand side from the central axis C under no application of a driving voltage.

As illustrated in FIG. 4, liquid crystal molecules 5a to 5f of the liquid crystal layer 5 are vertically aligned with respect to the respective surfaces (which are positioned above the alignment film (not illustrated)) of the counter substrate 3 and the array substrate 4 when no driving voltage is applied.

Figure 5:
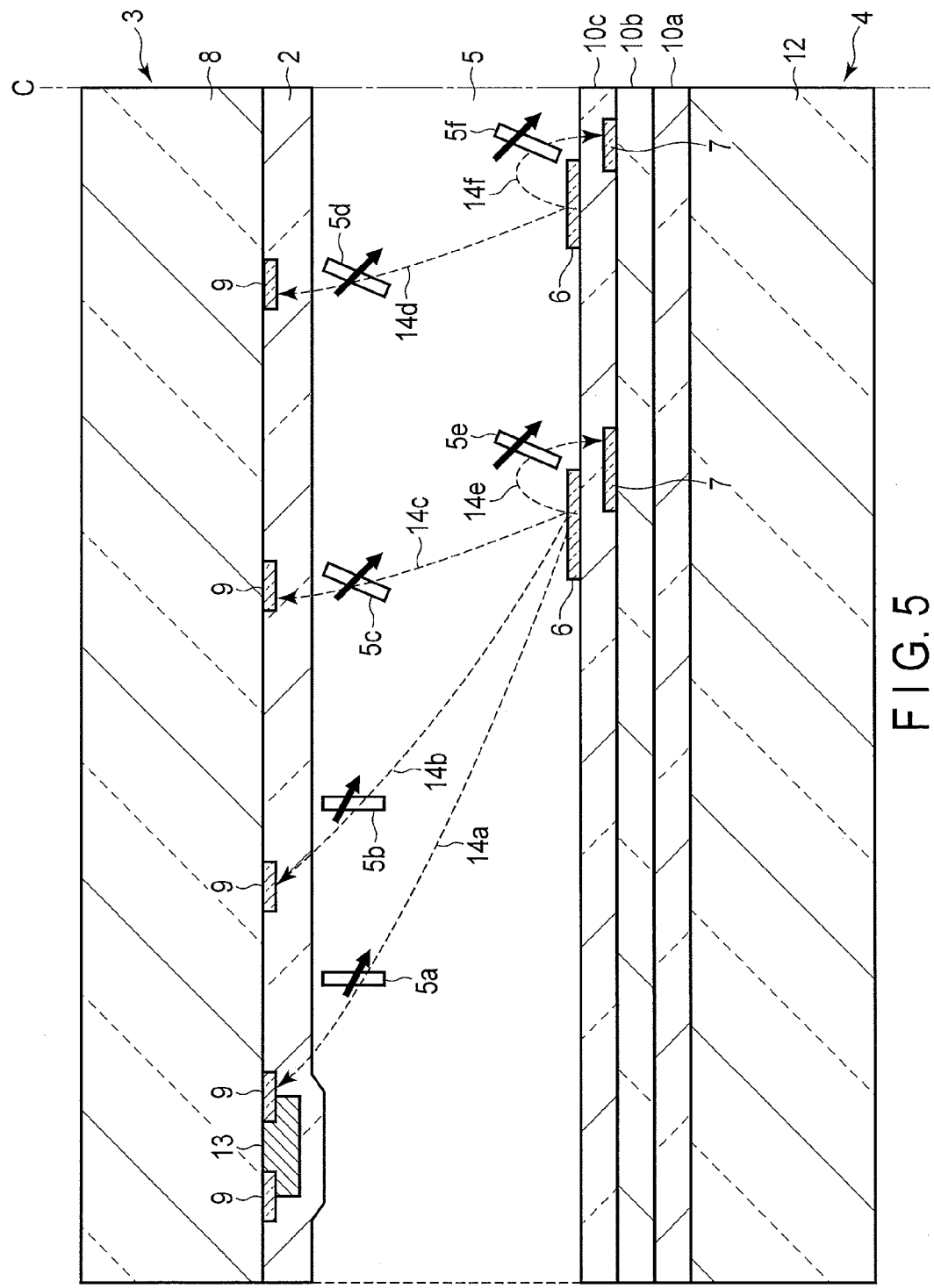
FIG. 5 is a partial cross-sectional diagram illustrating an example of the pixel on the left-hand side from the central axis C immediately after an application of a driving voltage.

FIG. 5 is a partial cross-sectional diagram illustrating an example of pixels on the left-hand side from the central axis C immediately after the application of the driving voltage.

At the side of the counter substrate 3 immediately after the driving voltage is applied, electrical flux lines 14a to 14d are formed starting from the first electrode 6 (pixel electrode) toward the third electrode 9 (common electrode). Furthermore, the liquid crystal molecules 5a to 5d begin to tilt to make the axes of the liquid crystal molecules 5a to 5d perpendicular to the directions of the electrical flux lines 14a to 14d.

At the side of the array substrate 4 immediately after the driving voltage is applied, electrical flux lines 14e and 14f are formed starting from the first electrode 6 toward the second electrodes 7 (common electrodes). Further, the liquid crystal molecules 5e and 5f begin to tilt to make the axes of the liquid crystal molecules 5e and 5f perpendicular to the directions of the electrical flux lines 14e and 14f.

Figure 6:
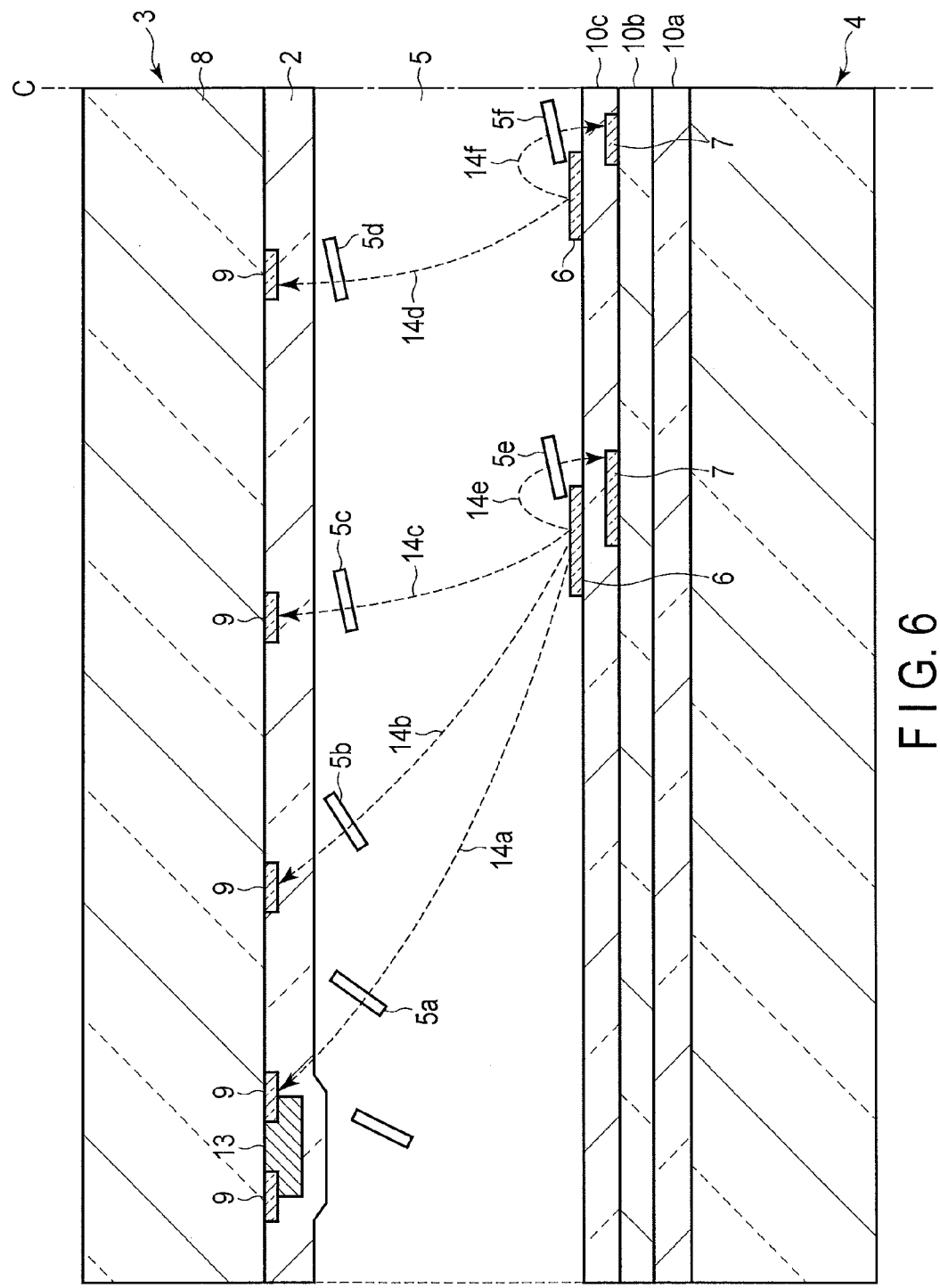
FIG. 6 is a partial cross-sectional diagram illustrating an example of the pixel on the left-hand side from the central axis C after a lapse of a predetermined time from the application of the driving voltage.

FIG. 6 is a partial cross-sectional diagram illustrating an example of pixels on the left-hand side from the central axis C after a lapse of a predetermined time from the application of a driving voltage.

The inclinations of the liquid crystal molecules 5a to 5d vary depending on the amplitude of the voltage. As illustrated in FIG. 6, the inclinations of the liquid crystal molecules 5a to 5f each are different according to the distances from the first electrode 6. Furthermore, the pixel is symmetrically formed about the central axis C. Therefore, depending on the inclinations of the liquid crystal molecules and the symmetric structure of the pixel, the liquid crystal molecules may be differently inclined at the time of applying the driving voltage, and thus it is possible to widen a viewing angle of the liquid crystal display.

Hereinbelow, a relation between the first through third electrodes 6, 7 and 9, and the operation of the liquid crystals will be described using FIGS. 7 and 8.

Figure 7:
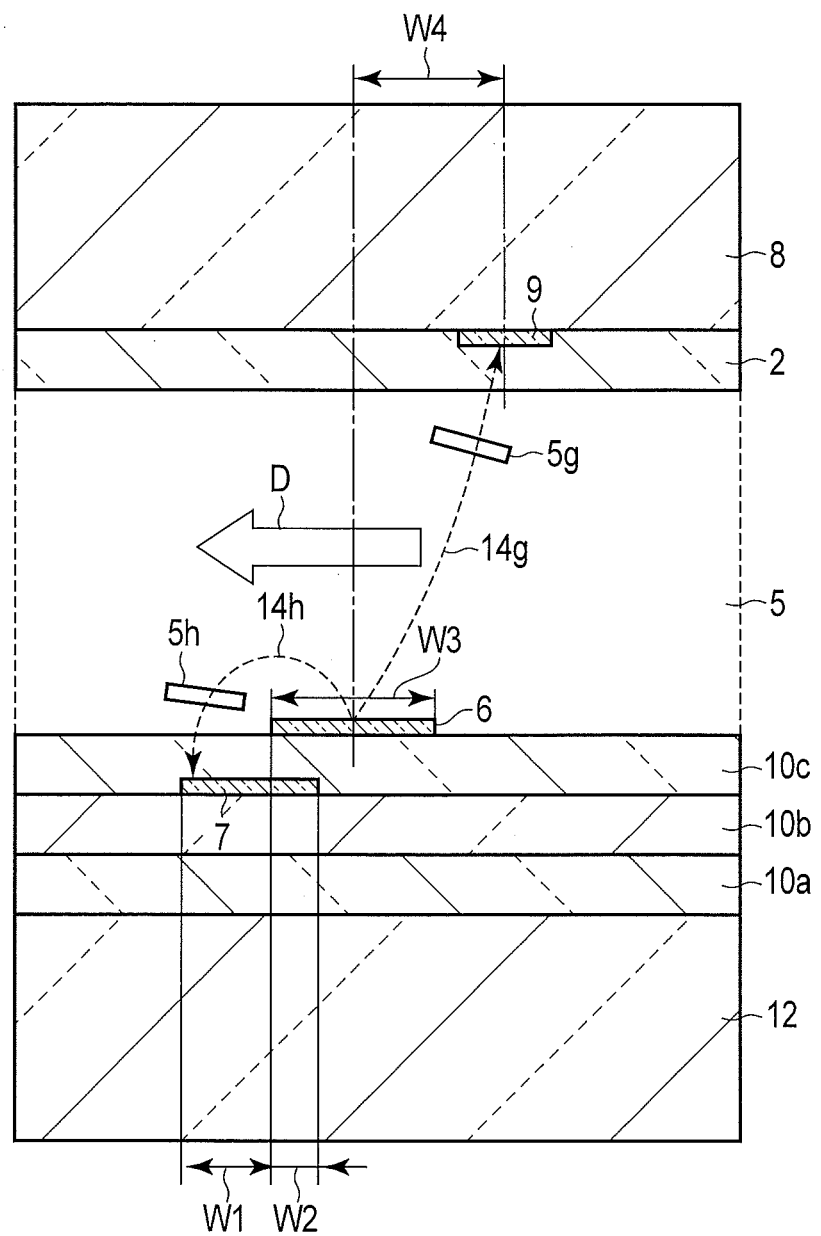
FIG. 7 is a partial cross-sectional diagram illustrating an example of an electrode arrangement in a rectangular pixel on the left-hand side.

FIG. 7 is a partial cross-sectional diagram illustrating an example of a rectangular pixel on the left-hand side.

Figure 8:
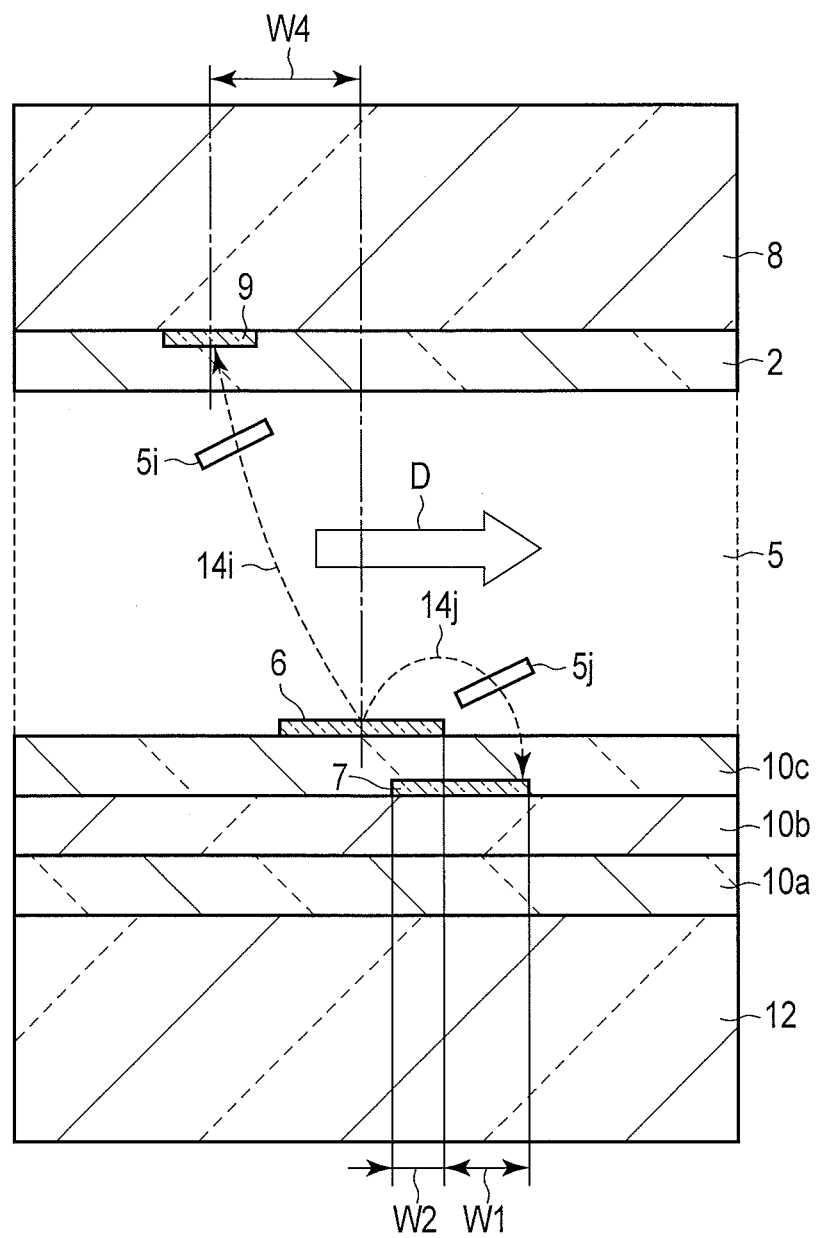
FIG. 8 is a partial cross-sectional diagram illustrating an example of an electrode arrangement in the rectangular pixel on a right-hand side.

FIG. 8 is a partial cross-sectional diagram illustrating an example of a rectangular pixel on the right-hand side.

As illustrated in FIGS. 7 and 8, the direction of tilts of the liquid crystal molecules 5g to 5j in the liquid crystal layer 5 are settable depending on the directions of shifting the first electrode 6 with respect to the second electrode 7 and the third electrode 9. For example, a protruding width W1 in the horizontal direction between the first electrode 6 and the second electrode 7 is appropriately adjusted based on the dimension of the liquid crystal cell, a relation with the driving voltage applied to the liquid crystals, or the like. For example, in a case where the pixel width falls within 10 µm to 300 µm, the protruding width W1 may be set to about 0.5 µm to 6 µm. The protruding width W1 may be reduced less than the thickness of the liquid crystal layer 5 in order to improve responsiveness of the liquid crystals.

In addition, the overlapping width W2 in the horizontal direction between the first electrode 6 and the second electrode 7 is adjusted based on an electric capacitance volume of the liquid crystal cell (pixel or sub-pixel) from the view point of the use of auxiliary capacity.

The width W3 of the first electrode 6 is appropriately adjusted based on a material used in the liquid crystal layer 5, conditions of the liquid crystal cell, conditions for the driving, and the like. The widths of the second and third electrodes 7 and 9 are also adjusted depending on the conditions of the liquid crystal cell. The width W3 of the first electrode is adjusted in the range from 2 µm to 20 µm in correspondence with the pixel size or the sub-pixel size. The distance W4 between the center of the comb teeth of the first electrode 6 and the center of the comb teeth of the third electrode 9, for example, is adjusted based on the conditions of the liquid crystal cell such as the dimension of the liquid crystal cell or the alignment characteristic of the liquid crystals to be used. The distance W4, for example, is set in the range from 2 µm to 30 µm.

The portion corresponding to the overlapping width W2 between the first electrode 6 and the second electrode 7 may be used as an auxiliary capacitor.

The protruding width W1 and the overlapping width W2 may be changed in one pixel based on at least one of the formation positions and the number of first electrodes 6 in the liquid crystal cell. The liquid crystal molecules of the liquid crystal layer 5 may be driven through the configuration in which plural TFT elements are formed in one pixel and the driving voltage is set to be different in the plural TFT elements. In order to alleviate an image-sticking of the liquid crystal display, the driving voltage to be applied to the first electrode 6, the second electrode 7, or the like may employ an offset (voltage shift). For example, in a case where one pixel or one sub-pixel is driven by two active elements or more and in similar cases, the timing or waveform of an applied voltage of the driving voltage of an active element may be adjusted. In a case where one pixel or one sub-pixel is driven by two active elements or more, the offset may be made by causing the amplitude of the voltage to be shifted and also the timing of applying the voltage to be shifted. A common voltage to be applied to the second electrode 7 or a common voltage to be applied to the third electrode 9 may be obtained by modulating the common voltage in order to improve responsiveness of the liquid crystals.

Vertically aligned liquid crystals essentially have an angle of inclination (a pre-tilt angle) of, for example, 89 degrees. Vertically aligned liquid crystals, in general, tilt in a direction in which the angle of inclination becomes small at the time of applying the driving voltage. In a general type of vertically aligned liquid crystals, the direction of tilt of the liquid crystal molecules is set by an initial tilt angle at the time of applying the driving voltage. In a case where such a general type of vertically aligned liquid crystals are used, each pixel or each sub-pixel is necessary for the alignment film (not illustrated) to be subjected to a rubbing process in plural directions or to be subjected to a photo-alignment process in plural direction.

On contrast, in the embodiment, the direction of tilt of the liquid crystal molecules is determined based on the electrical flux lines generated by the oblique electric field without making an inclination angle in the initial alignment of the vertically aligned liquid crystals. In the embodiment, for example, using the liquid crystals having the negative dielectric constant anisotropy, the initial alignment of the liquid crystals is set to be vertical alignment of substantially 90°. As described above, in the embodiment, there is no need to make the pre-tilt angle for the liquid crystals. However, in order to realize an ultrahigh-speed responsiveness of several milliseconds (ms) in the driving of liquid crystals, the pre-tilt angle, for example, in the range of about 89.7° to 88° may be formed in the liquid crystals using a PSA method. Through the formation of the slight pre-tilt angle in the liquid crystals, the ultra-high speed responsiveness can be achieved in the liquid crystal display device according to the embodiment. Alternatively, it is possible to realize the driving of liquid crystals using a lower voltage rather than that in the related art. In the PSA method, after the liquid crystals are formed in cells using a photosensitive alignment film or a polymerized composition, the liquid crystals are irradiated with light such as ultraviolet radiation while a driving voltage is applying to the first electrode and the like, so that the pre-tilt angle is formed in the alignment film or the inner wall of the liquid crystal cell. Based on the pre-tilt angle formed in the alignment film or the inner walls of the liquid crystal cell, the liquid crystal molecules are aligned at the pre-tilt angle.

In the embodiment, the initial alignment of the liquid crystals may be a vertical alignment or a horizontal alignment. The liquid crystal display device according to the embodiment may be a normally black display type or a normally white display type. As described above, the liquid crystal display device according to the embodiment may be configured such that the counter substrate including the color filter and the like is disposed to face the array substrate 4 on which the liquid crystal driving element such as the TFT and the like are formed, and the liquid crystal layer 5 is interposed between the counter substrate 3 and the array substrate 4. When the initial alignment of the liquid crystals is the horizontal alignment, the liquid crystals are risen from the horizontal direction to the vertical direction at the time of applying the voltage. When the initial alignment of the liquid crystals is the vertical alignment, the liquid crystal molecules tilt from the vertical direction to the horizontal direction at the time of applying the voltage. In this way, the liquid crystal layer 5 may employ either liquid crystals having negative dielectric constant anisotropy type of liquid crystals or liquid crystals having positive dielectric constant anisotropy. For example, as the negative dielectric constant anisotropy type of liquid crystals, a nematic liquid crystals may be employed which has a refractive index anisotropy ranging from 0.08 to 0.16 at about room temperature. In order to improve the responsiveness of the liquid crystals, in a case where the thickness of the liquid crystals is equal to or less than 3 μm, the liquid crystals having a high refractive index anisotropy, for example, the liquid crystals having Δn in the range of 0.1 to 0.16, may be employed. In a case where a positive dielectric constant anisotropy type of liquid crystals is employed, a liquid crystal material having a wider refractive index anisotropy characteristic may be employed. For example, as to be described below, a liquid crystal material (hereinafter, referred to as a fluorine liquid crystal) containing fluorine atoms in the molecular structure may be employed as a liquid crystal material. In practical, when the driving voltage is applied to the liquid crystals, a strong electric field is generated between the first electrode 6 and the protruding portion of the second electrode 7. For this reason, a low dielectric constant type (low dielectric constant anisotropy type) of liquid crystal material may be employed rather than the vertical alignment type of liquid crystal material which has been used in the related art. Therefore, it is possible to drive the liquid crystals at a low voltage. Even though the liquid crystal layer 5 is formed thick in some degree for the purpose of a high dielectric constant or a low saturation voltage, since the liquid crystals corresponding to the protruding portion of the second electrode 7 operates in high-speed responsiveness, the driving of liquid crystals at a lower voltage or the high driving speed of liquid crystals can be realized rather than the driving of liquid crystals in the related art. In general, the liquid crystal material having low dielectric constant anisotropy has a low viscosity. Using a low viscosity type of liquid crystal material, it is possible to reduce the falling time (i decay) when the driving voltage is off. Furthermore, the fluorine liquid crystal having a low dielectric constant is rarely mixed with ionic incombustibles; performance degradation such as degradation in a voltage holding rate due to impurities or the burn-in phenomenon of the display is reduced; and display unevenness does not easily occur. It is possible to reduce a threshold voltage or a rising time (i rise) using the liquid crystal material having a large absolute value of the dielectric constant anisotropy. In a case where the liquid crystal material having a large absolute value of the dielectric constant anisotropy is used, since the liquid crystals have a low viscosity, for example, a small amount of viscosity reducing agent such as an aluminum compound may be added to the liquid crystals. The thickness of the liquid crystal layer 5 is not particularly limited. For example, the thickness of the liquid crystal layer 5 may be equal to or less than 3.5 μm, and preferably a thin layer in the range of 1.5 μm to 3.4 μm may be applied in order to realize an ultrahigh-speed responsiveness of the liquid crystal display. In the embodiment, with the first through third electrodes 6, 7, and 9, the oblique electric field is used together with the protruding structure. In the embodiment described above, a viscosity, a relative dielectric constant, a birefringence index, an elastic constant of the liquid crystals are optimized, so that the power consumption in the liquid crystal display device can be reduced rather than the related art. The parameter And of the liquid crystal layer 5 which is effectively applicable in the embodiment is, for example, in the range of about 200 nm to 500 nm. As alignment films not illustrated in FIGS. 1 to 8, for example, a polyimide organic polymer film or an organic polymer having a polysiloxane structure may be employed by heating the films to be hardened. In addition, in the liquid crystal display device, for example, one to three pieces of retardation plates which are sealed to the polarizing plate can be employed.

Figure 10:
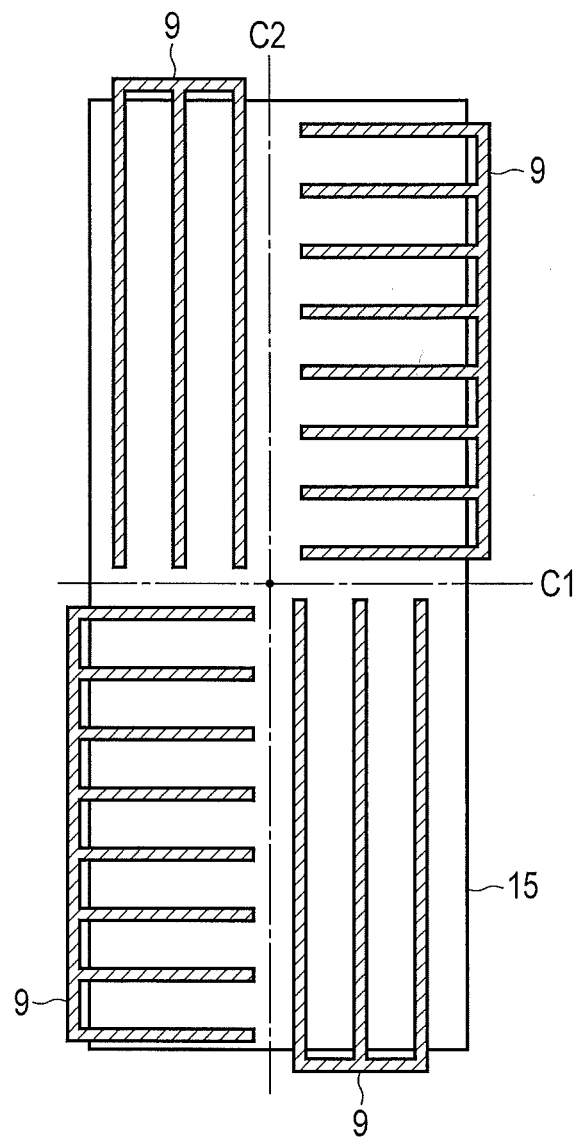
FIG. 10 is a top plan view illustrating a second example of the third electrode.
Figure 11:
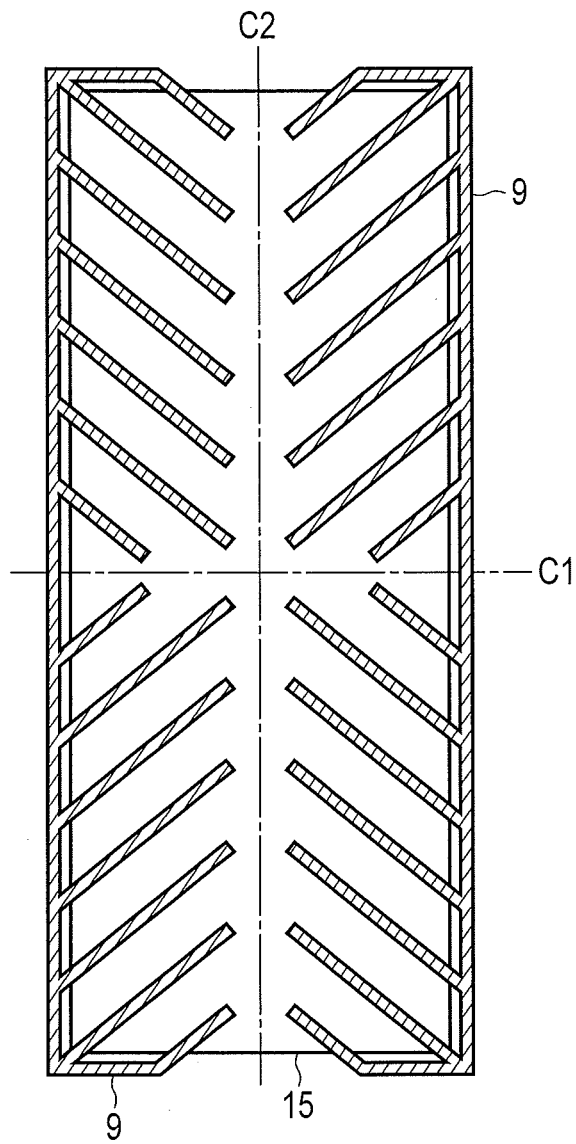
FIG. 11 is a top plan view illustrating a third example of the third electrode.

Hereinbelow, examples of plan arrangement states of the first through third electrodes 6, 7 and 9 will be described using FIGS. 9 to 11. In FIGS. 9 to 11, for example, the arrangement state of the third electrode 9 in the vertical direction will be exemplified.

FIG. 9 is a top plan view illustrating a first example of the third electrode 9.

The third electrode 9 is provided with respect to the pixel 15 having a rectangular shape in a plan view. The third electrode 9 is in the comb-tooth shape. The longitudinal direction of the comb teeth of the third electrode 9 is parallel to any sides of the pixel 15 in a plan view. The third electrode 9 is provided substantially parallel to the surface on the liquid crystal side of the substrate 8 of the counter substrate 3.

Further, the second electrode 7 is disposed on the lower side of the first electrode 6 with a gap with respect to the first electrode 6 to be parallelized thereto. The third electrode 9 is disposed on the upper side of the first electrode 6 with a gap with respect to the first electrode 6 to be parallelized thereto. This configuration is equally applied to the following descriptions of FIGS. 10 and 11.

FIG. 10 is a top plan view illustrating a second example of the third electrode 9.

In FIG. 10, the pixel 15 having a rectangular shape in a plan view is divided into four division regions by the center line C1 in the horizontal direction and by the center line C2 in the vertical direction. Further, each of the division regions is provided with the third electrode 9 in the comb-shaped form. The longitudinal direction of the comb teeth in the respective third electrodes 9 are parallel to the center line C1, the center line C2, or any sides of the pixel. At the center point at which the center lines C1 and C2 are intersected with each other, the four third electrodes 9 in the four division regions are disposed so as to be symmetrical about a point. In a case where any sides come into contact to each other between the division regions, the longitudinal direction of the comb teeth of the second electrodes 9 in the division regions of the contact sides may be differently set. In other words, the four third electrodes 9 may include the electrodes having different longitudinal directions of the comb teeth.

FIG. 11 is a top plan view illustrating a third example of the third electrode 9. In FIG. 11, the longitudinal direction of the comb teeth of the third electrode 9 is not parallel to the respective sides of the respective pixels or the respective division regions.

In FIG. 11, the pixel 15 having the rectangular shape in a plan view is divided into four division regions by the center line C1 in the horizontal direction and by the center line C2 in the vertical direction. The two third electrodes 9 are allocated for one pixel 15. One of the two third electrodes 9 is disposed on the right side of the pixel 15, and the other one is disposed on the left side of the pixel 15. The longitudinal direction of the comb teeth of the two third electrodes 9 are inclined to the center line C1 and the center line C2. In other words, the longitudinal directions of the comb teeth are neither parallel nor perpendicular to the center line C1 in the horizontal direction and the center line C2 in the vertical direction in a plan view. At the center point at which the center lines C1 and C2 are intersected with each other, the two third electrodes 9 are disposed so as to be symmetrical about a point.

In FIGS. 10 and 11, in order to form plural liquid crystal domains, the pixel 15 is divided into plural regions. Then, the longitudinal directions of the comb teeth in the plural regions are changed, so that it is possible to obtain a wide visibility angle.

Further, in FIGS. 9 to 11, the first electrode 6 and the second electrode 7 may be also disposed in the same state as that of the third electrode 9. For example, the second electrode 7 is disposed on the lower side of the first electrode 6 with a gap with respect to the first electrode 6 to be parallelized thereto. The third electrode 9 is disposed on the upper side of the first electrode 6 with a gap with respect to the first electrode 6 to be parallelized thereto.

The comb teeth of the second electrode 7 and the comb teeth of the third electrode 9 are shifted from the first electrode 6 in a direction (horizontal direction) parallel to the substrates 8 and 12 in cross-sectional view perpendicular to the longitudinal direction of the comb teeth. In cross-sectional view in the longitudinal direction of the comb teeth, the shifting direction from the first electrode 6 to the second electrode 7 in the horizontal direction is opposite to the shifting direction from the first electrode 6 to the third electrode 9 in the horizontal direction.

The first through third electrodes 6, 7 and 9 described above has been described in connection to the case of the formation in a unit of pixel 15. However, for example, the first through third electrodes 6, 7 and 9 described above may be formed in a unit of sub-pixel.

The planar shape of the pixel or the sub-pixel has been described as the rectangular shape in FIGS. 9 to 11, but other shapes may be employed. As an example of the planar shape of the pixel, a shape such as a parallelogram may be employed which has facing sides are parallel to each other.

The black matrix 13 is used to increase contrast of the liquid crystal display, which serves as a light blocking pattern disposed in a frame of the pixel or the sub-pixel (smallest unit of display) or at both sides of the pixel.

The rectangular pixel corresponds to the opening of the black matrix 13, and is synonymous with a "picture element".

The materials of the first electrode 6 and the second electrode 7 disposed on an array substrate 12 may include a conductive metal oxide such as ITO. In addition, as the materials of the first electrode 6 and the second electrode 7, a metal more conductive than the metal oxide may be employed. In a case the liquid crystal display is a reflective type or a transflective (semi-transparent) type, at least one material of the first electrode 6 and the second electrode 7 may be a thin film made of aluminum or aluminum alloy. In a case where the thin films made of aluminum or aluminum alloy are employed, an aluminum oxide protection layer may be formed on these thin films.

The first electrode 6, the second electrode 7, and the metal wiring lines of the active elements (not illustrated in FIGS. 1 to 11) are formed by interposing at least one of the insulating layers 10a to 10c such as silicon nitride (SiNx) or silicon oxide (SiOx). In FIGS. 1 to 11, the TFT element and the metal wiring lines connected to the TFT element are not illustrated. Further, for example, Japanese Patent Application KOKAI Publication No. 2009-105424 discloses a technology in which gate lines and source lines each are formed using a single aluminum alloy layer having a low contact property for the ITO (conductive metal oxide).

The liquid crystal display substrate 1 according to the embodiment is configured such that the counter substrate 3 is sealed to the array substrate 4 for which an active element such as a TFT is formed. The liquid crystal layer 5 is encapsulated between the counter substrate 3 and the array substrate 4.

In the array substrate 4, the comb-tooth shape or stripe shape of first and second electrodes 6 and 7 are provided. Further, the counter substrate 3 is provided with the comb-tooth shape or stripe shape of third electrode 9.

The liquid crystal display device according to the embodiment is further provided with a polarizing plate and a retardation plate on both surfaces of the substrate 1. With this configuration, the liquid crystal display device according to the embodiment is capable of displaying an image in monochromatic gray scales. On the surfaces of the counter substrate 3 and the array substrate 4, vertical alignment films may be coated and formed in advance. Further, the alignment films for the vertical alignment are not illustrated in the embodiment. In the embodiment, there is no need to perform a detailed alignment process (for example, an alignment process in which a tilt angle is set to 89°, and plural domains are formed in plural directions) which is required for the liquid crystal display device of the vertical alignment such as MVA or VATN, and the tilt angle of the liquid crystals can be set to about 90° through the vertical alignment.

The liquid crystal molecules of which the initial alignment is the vertical alignment begin to tilt so as to be vertically aligned with respect to the oblique electric field, at the time of applying the driving voltage, under the electrical flux lines (electric fields) generated between the first electrode 6 and the second electrode 7 or under the oblique electric field generated between the first electrode 6 and the third electrode 9.

In the embodiment, the second electrode 7 and the third electrode 9 are shifted in the opposite direction at the first electrode 6. The third electrode 9 and the second electrode 7, for example, may be applied with the same potential. The first electrode 6 (pixel electrode) may be electrically connected to a drain of the active element (TFT). In the embodiment, the TFT and the vertical alignment film are not illustrated.

In the liquid crystal display device according to the embodiment described above, disclination can be alleviated, a wide visibility angle can be obtained, and the brightness of the screen can increase.

In the embodiment, an effective driving of liquid crystals can be performed by the oblique electric field, and the liquid crystal can be improved in responsiveness.

Further, in the embodiment, the counter substrate 3, for example, may be configured to include the substrate 8, the third electrode 9 formed above the substrate 8, the black matrix 13 formed above the transparent substrate 8 above which the third electrode 9 is formed, and the transparent resin layer 2 formed above the substrate 3 above which the third electrode 9 and the black matrix 13 are formed.

The counter substrate 3, for example, may be configured to include the substrate 8, the black matrix 13 formed above the substrate 8, the transparent resin layer 2 formed above the substrate 8 above which the black matrix 13 is formed, and the third electrode 9 which is formed at a position corresponding to the opening of the black matrix 13 above the transparent resin layer 2.

Second Embodiment

In the present embodiment, a counter substrate equipped with a color filter at the openings of a black matrix (color filter substrate) will be described.

Figure 12:
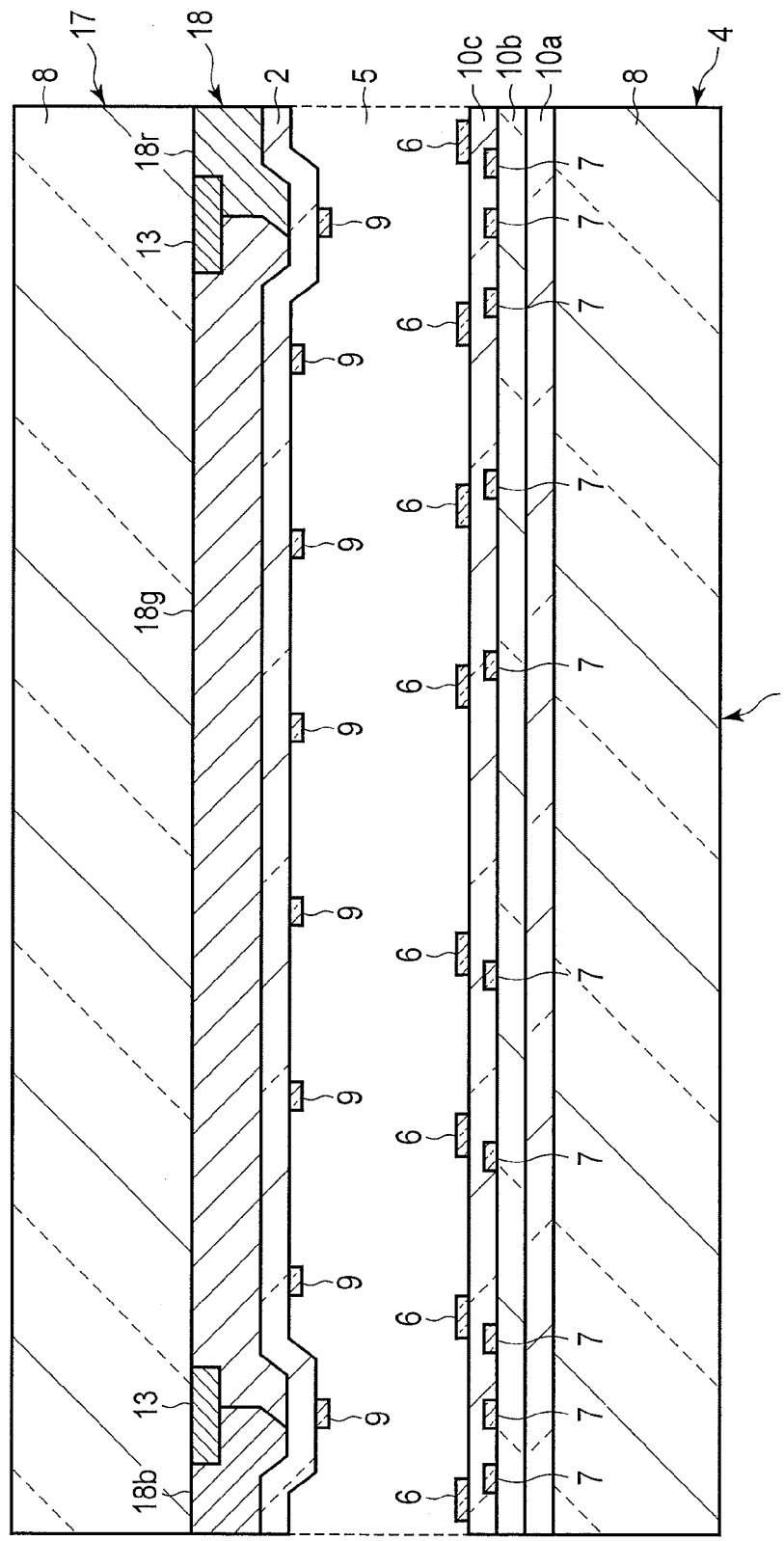
FIG. 12 is a partial cross-sectional diagram illustrating an example of a liquid crystal display substrate according to a second embodiment.

FIG. 12 is a cross-sectional diagram illustrating an example of a liquid crystal display substrate according to the present embodiment.

In the liquid crystal display substrate 16 according to the present embodiment, a counter substrate 17 and the array substrate 4 face each other. The counter substrate 17 and the array substrate 4 are sealed together, with a liquid crystal layer 5 interposed therebetween.

To be more specific, the liquid crystal layer 5 is disposed above the top surface of the array substrate 4. The third electrode 9 is disposed above the top surface of the liquid crystal layer 5. Above the top surfaces of the liquid crystal layer 5 and the third electrode 9, the transparent resin layer 2 is disposed. Above the top surfaces of the transparent resin layer 2, a color filter 18 and the black matrix 13 are disposed. The color filter 18 includes, for example, a red filter 18r, a green filter 18g, and a blue filter 18b. Above the top surfaces of the color filter 18 and the black matrix 13, the substrate 8 is disposed. In this FIG. 12, as viewed from a planar view, the comb teeth of the third electrode 9 and the comb teeth of the second electrode 7 are provided at the positions overlapping with the black matrix 13.

Figure 13:
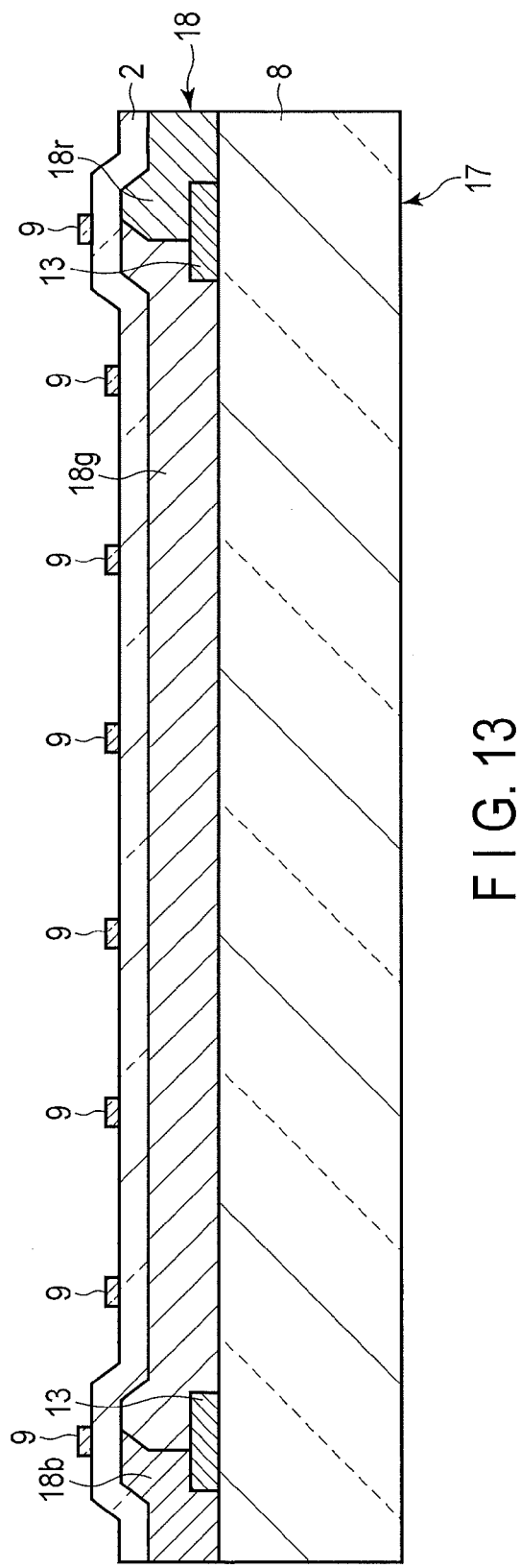
FIG. 13 is a partial cross-sectional diagram illustrating an example of a counter substrate equipped with a color filter.

FIG. 13 is a cross-sectional diagram illustrating an example of the counter substrate equipped with a color filter.

Above top of the substrate 8 of the counter substrate 17, the black matrix 13 having openings and the color filter 18 at the openings are formed. Above top of the color filter 18, the transparent resin layer 2 is formed. Above top of the transparent resin layer 2, the third electrode 9 is formed.

Figure 14:
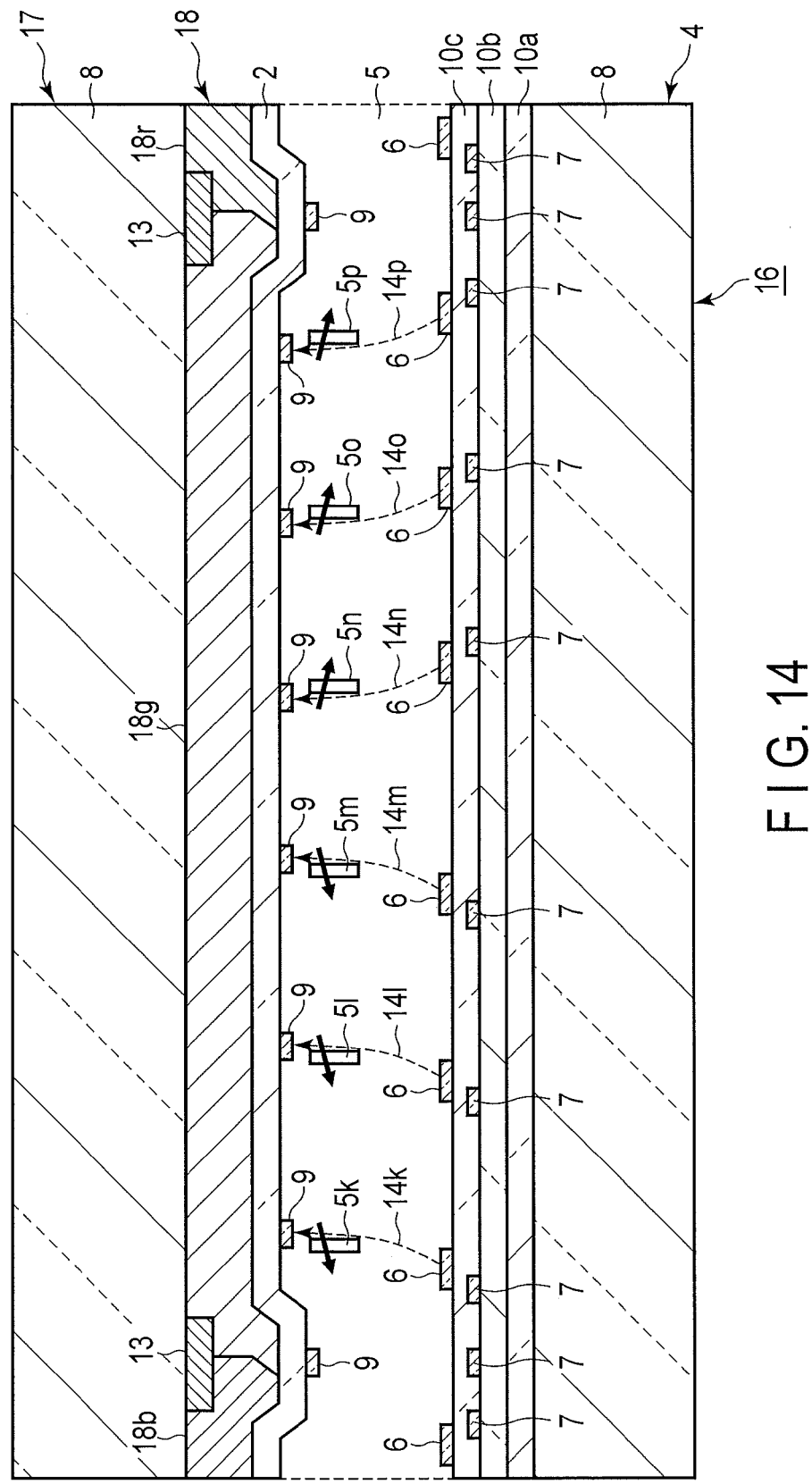
FIG. 14 is a partial cross-sectional diagram illustrating an example of a pixel immediately after an application of a driving voltage according to the second embodiment.

FIG. 14 is a partial cross-sectional diagram illustrating an example of a pixel immediately after the application of a driving voltage.

Liquid crystals 5k to 5p of the vertically oriented liquid crystal layer 5 are oriented vertically to the respective surfaces (above an alignment film that is not depicted in the diagram) of the counter substrate 17 and the array substrate 4, under no application of a driving voltage. Immediately after the application of a driving voltage, electrical flux lines 14k to 14p that are directed from the first electrode 6, which is a pixel electrode, toward the third electrode 9 are formed, and the liquid crystals 5k to 5p start to tilt such that the axis of the liquid crystals 5k to 5p is perpendicular to the direction of these electrical flux lines 14k to 14p.

FIG. 15 is a partial cross-sectional diagram illustrating an example of a pixel after a lapse of a predetermined time from the application of a driving voltage.

The change in the inclination of the liquid crystals 5k to 5p stops depending on the size of the voltage. As shown in FIG. 15, the liquid crystals 5k to 5p respectively have different inclinations in accordance with the distance from the first electrode 6. Depending on the voltage applied to the first through third electrodes 6, 7 and 9, the liquid crystals 5k to 5p can be made to have different inclinations at the time of the application of a driving voltage, and the field of vision of the liquid crystal display can be extended.

According to the present embodiment, the counter substrate 17 may include, for example, a light shielding layer as a material for forming the black matrix 13. Also, the counter substrate 17 may include, for example, a color layer as a material for forming the black matrix 13 or a material for forming the color filter 18. A light shielding layer is a coating film having light shielding properties, in which a light-shielding pigment is dispersed in a transparent resin. The light shielding layer is generally imparted with photosensitivity. The light shielding layer has a pattern formed therein by a photolithographic technique including exposure and development. A color layer is a coating film in which an organic pigment that will be described below is dispersed in a transparent resin. The color layer is formed by forming a coating film at the openings of the black matrix, and forming a pattern according to a photolithographic method.

According to the present embodiment, the relative permittivity of the color layer is a relatively important characteristic. The relative permittivity of this color layer is almost definitively determined based on the ratio of the organic pigment that is added as a colorant with respect to the transparent resin. Therefore, it is difficult to change the relative permittivity to a large extent. In other words, the kind or content of the organic pigment in the color layer is set based on the color purity required as the liquid crystal display device, and thereby, the relative permittivity of the color layer is also almost determined. In addition, the relative permittivity can be adjusted to 4 or greater by increasing the ratio of the organic pigment and thereby making the color layer into a thin film. Furthermore, the relative permittivity can be slightly increased by using a material having a high refractive index as the transparent resin. The relative permittivity of a color layer that uses an organic pigment falls approximately in the range of 2.9 to 4.5.

A color pixel filter that is included in the color filter 18 may include three colors of a red filter 18r, a green filter 18g, and a blue filter 18b; may also include complementary color-based filters such as a yellow filter; or may also include white pixels (transparent pixels). The color filter 18 may be provided not on the side of the counter substrate 17, but on the array substrate 4. Furthermore, it is also acceptable to use a backlight equipped with individual light emitting elements of red, green and blue colors, without using a color filter. For example, the liquid crystal display device according to the present embodiment may also be a color liquid crystal display device which is equipped with a LED backlight and utilizes time sharing light emission (field sequential).

In the following, examples of the shape and arrangement of the top plan view of pixels will be described by using FIG. 16 through FIG. 20.

FIG. 16 is a plan view illustrating an example of the shape and arrangement of the top plan view of a pixel including three sub-pixels.

In this FIG. 16, a color filter in a longitudinal stripe arrangement is illustrated. A rectangular (or square) pixel 19 includes a rectangular red sub-pixel 19r, a rectangular green sub-pixel 19g, and a rectangular blue sub-pixel 19b.

FIG. 17 is a plan view illustrating an example of the shape and arrangement of the top plan view of a pixel 19 including plural sub-pixels 19r, 19g and 19b, each having a polygonal shape in which the opposite sides are parallel to each other.

In this FIG. 17, a color filter in a lateral stripe arrangement is illustrated. The lines in the longitudinal direction are corrugated. Nine parallelogram-shaped red sub-pixels 19r are arranged in the row direction (transverse direction). In the lower row of the red sub-pixels 19r, nine parallelogram-shaped green sub-pixels 19g are arranged in the row direction. Below the green sub-pixels 19g, nine parallelogram-shaped blue sub-pixels 19g are arranged in the row direction. The pixel 19 is configured to include nine red sub-pixels 19r, nine green sub-pixels 19g, and nine blue sub-pixels 19b.

In FIG. 17, the inclinations of the four sides between the adjoining upper and lower rows are different. That is, two parallelogram-shaped sub-pixels arranged up and down are symmetric about the tangent line and are arranged in a "<" shape (or an arrowhead shape, a form obtained by rotating the letter "V" by 90°). A red sub-pixel 19r and a red sub-pixel 19r that is two rows below across a green sub-pixel 19g and a blue sub-pixel 19b, have different angles of the four sides. A green sub-pixel 19g and a green sub-pixel 19g that is two rows below across a blue sub-pixel 19b and a red sub-pixel 19r, have different angles of the four sides. A blue sub-pixel 19b and a blue sub-pixel 19b that is two rows below across a red sub-pixel 19r and a green sub-pixel 19g, have different angles of the four sides.

FIG. 18 is a plan view illustrating an example of the shape and arrangement of the top plan view of a pixel 19 in a longitudinal stripe arrangement, which includes plural parallelogram-shaped sub-pixels 19r, 19g and 19b. The lines in the longitudinal direction are corrugated.

In this FIG. 18, a red sub-pixel 19r, a green sub-pixel 19g, and a blue sub-pixel 19b are arranged in the row direction, and plural red sub-pixels 19r, plural green sub-pixels 19g, and plural blue sub-pixels 19b are respectively arranged in the column direction (longitudinal direction).

FIG. 19 is a plan view illustrating an example of the shape and arrangement of the top plan view of a pixel 19 in a lateral stripe arrangement, which includes plural parallelogram-shaped sub-pixels 19r, 19g and 19b.

In the parallelogram-shaped pixel or sub-pixel such as described above, the comb teeth directions of the first through third electrodes 6, 7 and 9 may be parallel to the upper side or the lower side, or may be parallel to the oblique side.

In this FIG. 19, similarly to the case of FIG. 17 described above, plural red sub-pixels 19r, plural green sub-pixels 19g, and plural blue sub-pixels 19b are respectively arranged in the row direction, and a red sub-pixels 19r, a green sub-pixel 19g and a blue sub-pixel 19b are arranged in the longitudinal direction.

FIG. 20 is a plan view illustrating an example of the shape and arrangement of the top plan view of the sub-pixels 19r, 19g and 19b, and the pixel 19, in which the "<" shape is formed in a unit.

As such, the pixel 19 may be constructed by the sub-pixels 19r, 19g and 19b having the "<" shape. Plural pixels 19 may be in a lateral stripe arrangement, or may be in a longitudinal stripe arrangement.

In the "<"-shaped pixel or sub-pixel such as described above, the comb teeth direction of the first through third electrodes 6, 7 and 9 can be arranged in parallel to any side of the pixel or sub-pixel.

In the liquid crystal display substrate 16 equipped with the color filter 18 according to the present embodiment as described above, disclination can be reduced, the viewing angle can be widened, and the screen can be made brighter.

By using the substrate 16 according to the present embodiment, liquid crystal driving can be effectively carried out by an oblique electric field, and the responsiveness of liquid crystals can be enhanced.

As in the case of the present embodiment, the shape of the pixel 19 and the sub-pixels 19r, 19g and 19b can be freely set, and thereby, the alignment of the liquid crystals can be changed, while a wide viewing angle can be realized.

Meanwhile, in the present embodiment, the counter substrate 17 may be configured to include a substrate 8, a third electrode 9 formed above the substrate 8, the black matrix 13 formed above the substrate 8 above which the third electrode 9 is formed, the color filter 18 formed at the openings of the black matrix 13, and the transparent resin layer 2 formed above the color filter 18.

The counter substrate 17 may also be configured to include, for example, the substrate 8, the black matrix 13 formed above the substrate 8, the third electrode 9 formed at the openings of the black matrix 13, the color filter 18 formed at the openings of the black matrix 13 above which the third electrode 9 is formed, and the transparent resin layer 2 formed above the color filter 18.

Third Embodiment

In the present embodiment, examples of the transparent resin, organic pigment and the like that can be used in the color filter 18 that has been described in the second embodiment will be explained.

[Transparent Resin]

A photosensitive color composition used in the formation of a light shielding layer or a color layer contains a pigment dispersion, as well as a polyfunctional monomer, a photosensitive resin or a non-photosensitive resin, a polymerization initiator, a solvent and the like. Hereinafter, highly transparent organic resins that can be used in the present embodiment, such as photosensitive resins and non-photosensitive resins, are collectively referred to as transparent resins.

Transparent resins include thermoplastic resins, thermosetting resins, or photosensitive resins. Examples of the thermoplastic resins that may be used include a butyral resin, a styrene-maleic acid copolymer, chlorinated polyethylene, chlorinated polypropylene, polyvinyl chloride, a vinyl chloride-vinyl acetate copolymer, polyvinyl acetate, a polyurethane-based resin, a polyester resin, an acrylic acid resin, an alkyd resin, a polystyrene resin, a polyamide resin, a rubber-based resin, a cyclized rubber-based resin, a cellulose, polybutadiene, polyethylene, polypropylene, and a polyimide resin. Examples of the thermosetting resins that may be used include an epoxy resin, a benzoguanamine resin, a rosin-modified maleic acid resin, a rosin-modified fumaric acid resin, a melamine resin, a urea resin, and a phenolic resin. As the thermosetting resin, for example, a substance obtainable by causing a melamine resin to react with a compound containing an isocyanate group may also be used.

[Alkali-Soluble Resin]

In the formation of a light shielding layer and a color layer, which are material for forming the black matrix 13 used in the present embodiment, it is preferable to use a photosensitive resin composition capable of forming a pattern by photolithography. The transparent resin is preferably a resin imparted with alkali-solubility. As for the alkali-soluble resin, a resin containing a carboxyl group or a hydroxyl group can be used. Examples of the alkali-soluble resin that can be used include an epoxy acrylate-based resin, a novolac-based resin, a polyvinylphenol-based resin, an acrylic resin, a carboxyl group-containing epoxy resin, and a carboxyl group-containing urethane resin. Preferred examples of the alkali-soluble resin include an epoxy acrylate-based resin, a novolac-based resin, and an acrylic resin, and particularly preferred examples include an epoxy acrylate-based resin and a novolac-based resin.

[Acrylic Resin]

As for the transparent resin, for example, the following acrylic resins can be applied.

As the acrylic resin, use is made of polymers obtainable by using, as monomers, for example, (meth)acrylic acid; alkyl (meth)acrylates such as methyl(meth)acrylate, ethyl(meth)acrylate, propyl(meth)acrylate, butyl(meth)acrylate, t-butyl (meth)acrylate, pentyl(meth)acrylate, and lauryl(meth)acrylate; hydroxyl group-containing (meth)acrylates such as hydroxyethyl(meth)acrylate and hydroxypropyl(meth)acrylate; ether group-containing (meth)acrylates such as ethoxyethyl(meth)acrylate and glycidyl(meth)acrylate; and alicyclic(meth)acrylates such as cyclohexyl(meth)acrylate, isobornyl(meth)acrylate, and dicyclopentenyl(meth)acrylate.

Meanwhile, for the monomers described above, one kind of substance may be used, or two or more kinds of substances may be used in combination. Furthermore, copolymers of compounds capable of copolymerizing with the monomers, such as styrene, cyclohexyl maleimide or phenylmaleimide, may also be used as the acrylic resin.

For example, a resin having photosensitivity may also be obtained by causing a copolymer obtained by copolymerizing carboxylic acid having an ethylenically unsaturated group, such as (meth)acrylic acid, to react with a compound containing an epoxy group and an unsaturated double bond, such as glycidyl methacrylate. Furthermore, a resin having photosensitivity may also be obtained by adding a carboxylic acid-containing compound such as (meth)acrylic acid, to a copolymer of a polymer of epoxy group-containing (meth)acrylate such as glycidyl methacrylate or a polymer of epoxy group-containing (meth)acrylate such as glycidyl methacrylate, with another (meth)acrylate.

For example, a resin having photosensitivity may also be obtained by causing a polymer having a hydroxyl group and a monomer such as hydroxyethyl methacrylate, to react with a compound having an isocyanate group and an ethylenically unsaturated group, such as methacryloyloxyethyl isocyanate.

Furthermore, as described above, a resin having a carboxyl group can be obtained by causing a copolymer of hydroxyethyl methacrylate having plural hydroxyl groups or the like to react with a polybasic acid anhydride, and introducing a carboxyl group to the copolymer. The method for producing a resin having a carboxyl group is not intended to be limited to this method only.

Examples of the acid anhydride used in the reaction described above include, for example, malonic anhydride, succinic anhydride, maleic anhydride, itaconic anhydride, phthalic anhydride, tetrahydrophthalic anhydride, hexahydrophthalic anhydride, methyltetrahydrophthalic anhydride, and trimellitic anhydride.

The solid component acid value of the acrylic resin described above is preferably 20 mg KOH/g to 180 mg KOH/g. If the acid value is smaller than 20 mg KOH/g, the rate of development of the photosensitive resin composition is too slow, and a longer time is required for development, so that productivity tends to deteriorate. Furthermore, if the solid component acid value is larger than 180 mg KOH/g, on the contrary, the rate of development is too fast, defects such as pattern peeling or pattern chipping after development tend to occur.

Furthermore, when the acrylic resin has photosensitivity, the double bond equivalent of this acrylic resin is preferably 100 or greater, more preferably 100 to 2000, and most preferably 100 to 1000. If the double bond equivalent is greater than 2000, sufficient photocurability may not be obtained.

[Photopolymerizable Monomer]

Examples of the photopolymerizable monomer that can be used include various acrylic acid esters and methacrylic acid esters, such as 2-hydroxyethyl(meth)acrylate, 2-hydroxypropyl(meth)acrylate, cyclohexyl(meth)acrylate, polyethylene glycol di(meth)acrylate, pentaerythritol tri(meth)acrylate, trimethylolpropane tri(meth)acrylate, dipentaerythritol hexa (meth)acrylate, tricyclodecanyl(meth)acrylate, melamine (meth)acrylate, and epoxy(meth)acrylate; (meth)acrylic acid, styrene, vinyl acetate, (meth)acrylamide, N-hydroxymethyl (meth)acrylamide, and acrylonitrile.

Furthermore, as the photopolymerizable monomer, for example, a polyfunctional urethane acrylate having a (meth) acryloyl group that is obtainable by causing a (meth)acrylate having a hydroxyl group to react with a polyfunctional isocyanate, is preferably used. Meanwhile, the combination of the (meth)acrylate having a hydroxyl group and the polyfunctional isocyanate is arbitrary and is not particularly limited. Furthermore, one kind of a polyfunctional urethane acrylate may be used alone as the photopolymerizable monomer, or two or more kinds can also be used in combination.

[Photopolymerization Initiator]

Examples of the photopolymerization initiator that can be used include acetophenone-based compounds such as 4-phenoxydichloroacetophenone, 4-t-butyldichloroacetophenone, diethoxyacetophenone, 1-(4-isopropylphenyl)-2-hydroxy-2-methylpropan-1-one, 1-hydroxycyclohexyl phenyl ketone, and 2-benzyl-2-dimethylamino-1-(4-morpholiniophenyl)-butan-1-one; benzoin-based compounds such as benzoin, benzoin methyl ether, benzoin ethyl ether, benzoin isopropyl ether, and benzyl dimethyl ketal; benzophenone-based compounds such as benzophenone, benzoylbenzoic acid, methyl benzoylbenzoate, 4-phenylbenzophenone, hydroxybenzophenone, acrylated benzophenone, and 4-benzoyl-4'-methyldiphenyl sulfide; thioxanthone-based compounds such as thioxanthone, 2-chlorothioxanthone, 2-methylthioxanthone, isopropylthioxanthone, and 2,4-diisopropylthioxanthone; triazine-based compounds such as 2,4,6-trichloro-s-triazine, 2-phenyl-4,6-bis(trichloromethyl)-2-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, 2,4-bis(trichloromethyl)-6-styryl-s-triazine, 2-(naphth-1-yl)-4,6-bis(trichloromethyl)-s-triazine, 2-(4-methoxynaphth-1-yl)-4,6-bis(trichloromethyl)-s-triazine, 2,4-trichloromethyl-(piperonyl)-6-triazine, and 2,4-trichloromethyl(4'-methoxystyryl)-6-triazine; oxime ester-based compounds such as 1,2-octanedione, 1-[4-(phenylthio)-, 2-(O-benzoyloxime)], and O-(acetyl)-N-(1-phenyl-2-oxo-2-(4'-methoxynaphthyl)ethylidene)hydroxylamine; phosphine-based compounds such as bis(2,4,6-trimethylbenzoyl)phenylphosphine oxide and 2,4,6-trimethylbenzoyldiphenylphosphine oxide; quinone-based compounds such as 9,10-phenanthrenequinone, camphor-quinone, and ethylanthraquinone; borate-based compounds; carbazole-based compounds; imidazole-based compounds; and titanocene-based compounds. In order to increase sensitivity, it is effective to use oxime derivatives (oxime-based compounds). These substances may be used singly or in combination of two or more kinds.

[Sensitizer]

Regarding the sensitizer, for example, it is preferable to use a photopolymerization initiator and a sensitizer in combination. Examples of the sensitizer that can be used in combination include compounds such as α-acyloxy ester, acylphosphine oxide, methylphenyl glyoxylate, benzyl-9,10-phenanthrenequinone, camphor-quinone, ethylanthraquinone, 4,4'-diethylisophthalophenone, 3,3',4,4'-tetra(t-butylperoxycarbonyl)benzophenone, and 4,4'-diethylaminobenzophenone.

The sensitizer can be incorporated in an amount of from 0.1 parts by mass to 60 parts by mass, relative to 100 parts by mass of the photopolymerization initiator.

[Ethylenically Unsaturated Compound]

The photopolymerization initiators described above are preferably used together with ethylenically unsaturated compounds. An ethylenically unsaturated compound means a compound having one or more ethylenically unsaturated bonds in the molecule. Furthermore, the photopolymerization initiator is preferably a compound having two or more ethylenically unsaturated bonds in the molecule, from the viewpoint of enhancing polymerizability, crosslinkability, and the difference in the solubility in the developing solution between exposed areas and non-exposed areas associated therewith. Furthermore, the photopolymerization initiator is particularly preferably a (meth)acrylate compound in which the unsaturated bond is derived from a (meth)acryloyloxy group.

Examples of the compound having one or more ethylenically unsaturated bonds in the molecule that may be used include unsaturated carboxylic acids such as (meth)acrylic acid, crotonic acid, isocrotonic acid, maleic acid, itaconic acid and citraconic acid, and alkyl esters thereof; (meth)acrylonitrile; (meth)acrylamide; and styrene. Examples of the compound having two or more ethylenically unsaturated bonds in the molecule that may be used include esters between unsaturated carboxylic acids and polyhydroxy compounds; (meth)acryloyloxy group-containing phosphates; urethane(meth)acrylates between hydroxy(meth)acrylate compounds and polyisocyanate compounds; and epoxy (meth)acrylates between (meth)acrylic acid or hydroxy (meth)acrylate compounds and polyepoxy compounds.

The photopolymerizable initiator, sensitizer and ethylenically unsaturated compounds described above may be added to a composition containing a polymerizable liquid crystal compound, in the case of forming a retardation layer inside a liquid crystal cell.

[Polyfunctional Thiol]

In the photosensitive coloring composition, a polyfunctional thiol that functions as a chain transfer agent can be incorporated. The polyfunctional thiol may be a compound having two or more thiol groups, and examples thereof that can be used include hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropanetris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine.

These polyfunctional thiols can be used singly or as mixtures of two or more kinds. The polyfunctional thiol can be used in an amount of preferably 0.2 parts to 150 parts by mass, and more preferably 0.2 parts to 100 parts by mass, relative to 100 parts by mass of the pigment in the photosensitive coloring composition.

[Storage Stabilizer]

In the photosensitive coloring composition, a storage stabilizer can be incorporated in order to stabilize the viscosity over time of the composition. Examples of the storage stabilizer that can be used include quaternary ammonium chlorides such as benzyl trimethyl chloride and diethylhydroxyamine; organic acids such as lactic acid and oxalic acid, and methyl ethers thereof; organic phosphines such as t-butylpyrocatechol, triethylphosphine, and triphenylphosphine; and phosphorous acid salts. The storage stabilizer can be incorporated in an amount of from 0.1 parts by mass to 10 parts by mass relative to 100 parts by mass of the pigment in the photosensitive coloring composition.

[Adhesion Improving Agent]

In the photosensitive coloring composition, an adhesion improving agent such as a silane coupling agent can be incorporated in order to increase the adhesiveness to the substrate. Examples of the silane coupling agent that can be used include vinyl silanes such as vinyl tris(β-methoxyethoxy)silane, vinyl ethoxysilane, and vinyl trimethoxysilane; (meth)acrylsilanes such as γ-methacryloxypropyl trimethoxysilane; epoxysilanes such as β-(3,4-epoxycyclohexyl)ethyl trimethoxysilane, β-(3,4-epoxycyclohexyl)methyl trimethoxysilane, β-(3,4-epoxycyclohexyl)ethyl triethoxysilane, β-(3,4-epoxycyclohexyl)methyl triethoxysilane, γ-glycidoxypropyl trimethoxysilane, and γ-glycidoxypropyl triethoxysilane; aminosilanes such as N-β-(aminoethyl)-γ-aminopropyl trimethoxysilane, N-β-(aminoethyl)-γ-aminopropyl triethoxysilane, N-β-(aminoethyl)-γ-aminopropylmethyl diethoxysilane, γ-aminopropyl triethoxysilane, γ-aminopropyl trimethoxysilane, N-phenyl-γ-aminopropyl trimethoxysilane, and N-phenyl-γ-aminopropyl triethoxysilane; and thiosilanes such as γ-mercaptopropyl trimethoxysilane and γ-mercaptopropyl triethoxysilane. The silane coupling agent can be incorporated in an amount of 0.01 parts by mass to 100 parts by mass relative to 100 parts by mass of the pigment in the photosensitive coloring composition.

[Solvent]

In the photosensitive coloring composition, in order to enable uniform coating on the substrate, for example, a solvent such as water or an organic solvent is incorporated. Furthermore, if the composition used in the present embodiment forms a color layer of a color filter, the solvent also has a function of uniformly dispersing the pigment. Examples of the solvent that can be used include cyclohexanone, ethylcellosolve acetate, butylcellosolve acetate, 1-methoxy-2-propyl acetate, diethylene glycol dimethyl ether, ethylbenzene, ethylene glycol diethyl ether, xylene, etylcellosolve, methyl n-amyl ketone, propylene glycol monomethyl ether, toluene, methyl ethyl ketone, ethyl acetate, methanol, ethanol, isopropyl alcohol, butanol, isobutyl ketone, and petroleum-based solvents. Regarding the solvent, these substances can be used singly or as mixtures. The solvent can be incorporated in an amount of from 800 parts by mass to 4000 parts by mass, and preferably from 1000 parts by mass to 2500 parts by mass, relative to 100 parts by mass of the pigment in the coloring composition.

[Organic Pigment]

Examples of red pigments that can be used include C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, and 279.

Examples of yellow pigments that can be used include C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214.

Examples of blue pigments that can be used include C.I. Pigment Blue 15, 15:1, 15:2, 15:3, 15:4, 15:6, 16, 22, 60, 64, and 80. Among these, C.I. Pigment Blue 15:6 is preferred.

Examples of violet pigments that can be used include C.I. Pigment Violet 1, 19, 23, 27, 29, 30, 32, 37, 40, 42, and 50. Among these, C.I. Pigment Violet 23 is preferred.

Examples of green pigments that can be used include C.I. Pigment Green 1, 2, 4, 7, 8, 10, 13, 14, 15, 17, 18, 19, 26, 36, 45, 48, 50, 51, 54, 55, and 58. Among these, C.I. Pigment Green 58 is preferred.

Hereinafter, in the description for the pigment kinds of C.I. Pigments, the pigment kinds may be described simply with abbreviations such as PB (Pigment Blue), PV (Pigment Violet), PR (Pigment Red), PY (Pigment Yellow), and PG (Pigment Green).

[Coloring Material of Light Shielding Layer]

A light shielding coloring material that is included in the light shielding layer or black matrix is a coloring material exhibiting a light shielding function by having absorption in the visible light wavelength region. According to the present embodiment, as the light shielding coloring material, for example, an organic pigment, an inorganic pigment, a dye, and the like are used. Examples of the inorganic pigment that may be used include carbon black and titanium oxide. Examples of the dye that may be used include azo-based dyes, anthraquinone-based dyes, phthalocyanine-based dyes, quinoneimine-based dyes, quinoline-based dyes, nitro-based dyes, carbonyl-based dyes, and methine-based dyes. Regarding the organic pigment, the organic pigments described above can be employed. Meanwhile, the light shielding component may be used singly, or two or more kinds may be used together at any combination and proportions. Furthermore, these coloring materials may also be imparted with high volume resistivity by coating the surface of the coloring materials with a resin. On the contrary, these coloring materials may also be imparted with low volume resistivity, by increasing the content ratio of the coloring material with respect to the parent material of the resin and imparting slight electrical conductivity to the component. However, the volume resistivity value of these light shielding materials is appropriately in the range of $1\times10^8 \Omega\cdot cm$ to $1\times10^{15} \Omega\cdot cm$, which is not at a level capable of affecting the resistance value of the transparent conductive film. Similarly, the relative permittivity of the light shielding layer can also be adjusted approximately in the range of 3 to 11, by means of the selection of the coloring material or the content ratio. The relative permittivities of the light shielding layer, the first transparent resin layer, and the coloring layer can be adjusted according to the design conditions for the liquid crystal display device or the driving conditions for the liquid crystals.

[Dispersant and Dispersant Aid]

It is preferable to use a polymer dispersant as the pigment dispersant, because polymer dispersants have excellent dispersion stability over time. Examples of the polymer dispersant that can be used include a urethane-based dispersant, a polyethyleneimine-based dispersant, a polyoxyethylene alkyl ether-based dispersant, a polyoxyethylene glycol diester-based dispersant, a sorbitan aliphatic ester-based dispersant, and an aliphatic-modified polyester-based dispersant. Among them, particularly, dispersants formed from graft copolymers containing nitrogen atoms are preferred because those dispersants have excellent developing properties with regard to the light shielding photosensitive resin composition used in the present embodiment, which contains a large proportion of pigments. The dispersants may be used singly, or two or more kinds may be used together at any combination and proportions.

Examples of a dispersion aid that can be used include colorant derivatives. Examples of the colorant derivatives that can be used include azo-based, phthalocyanine-based, quinacridone-based, benzimidazolone-based, quinophthalone-based, isoindolinone-based, dioxazine-based, anthraquinone-based, indanthrene-based, perylene-based, perinone-based, diketopyrrolopyrrole-based, and dioxazine-based derivatives. Among them, quinophthalone-based derivatives are preferred.

Regarding substituents for the colorant derivatives, for example, a sulfonic acid group, a sulfonamide group and quaternary salts thereof, a phthalimidomethyl group, a dialkylaminoalkyl group, a hydroxyl group, a carboxyl group, and an amide group may be bonded to the pigment skeleton directly or via an alkyl group, an aryl group, a heterocyclic group or the like. Among these, a sulfonic acid group is preferably used. Also, these substituents may be substituted plural times in a pigment skeleton.

Examples of the colorant derivatives that can be used include sulfonic acid derivatives of phthalocyanine, sulfonic acid derivatives of quinophthalone, sulfonic acid derivatives of anthraquinone, sulfonic acid derivatives of quinacridone, sulfonic acid derivatives of diketopyrrolopyrrole, and sulfonic acid derivatives of dioxazine.

The dispersion aids and colorant derivatives described above may be used singly, or two or more kinds may be used together at any combination and proportions.

Fourth Embodiment

In the present embodiment, the production of the counter substrate 3 shown in FIG. 1 will be described.

[Formation of Third Electrode 9]

In the production process for this counter substrate 3, first, a black matrix 13 is formed on a transparent substrate 8 which is an alkali-free glass plate.

Next, a film of ITO (a metal oxide thin film of indium and tin) for forming a third electrode is formed on the transparent substrate 8 on which the black matrix 13 is formed, so as to cover the entire surface, by using a sputtering apparatus. This film of ITO is formed to have a film thickness of 0.14 μm at normal temperature by using a sputtering apparatus.

Next, ITO is formed in, for example, a comb teeth shape having a width of 7 μm by a photolithographic method. This comb-shaped ITO serves as the third electrode 9, which is a common electrode.

Meanwhile, in an ITO film formed at room temperature, annealing is required in order to increase the transmittance. A heat treatment for annealing may be carried out together with a film curing treatment for the black matrix or the like in the subsequent processes.

Further, the transparent resin layer 2 is formed on the surface where the third electrode 9 is formed.

Regarding the pattern shape of the third electrode 9, the shapes shown in FIG. 9 to FIG. 11 as described above can be applied. The black matrix 13 and the transparent resin layer 2 are formed by, for example, a forming means that will be described below.

Furthermore, the pattern width of the third electrode 9 formed from ITO is adjusted to the range of 2 μm to 30 μm according to the pixel size. The formation density or pattern width of the third electrode 9 may vary within a pixel. When the pattern shape or density distribution is made point-symmetric or axisymmetric about the center of a pixel, a liquid tilt that is symmetric about the center of the pixel can be realized, and a wide viewing angle in the liquid crystal display can be secured.

Meanwhile, the first and second electrodes 6 and 7 can also be produced by the same technique as that for this third electrode 9.

[Formation of Black Matrix 13]
<Dispersion Liquid for Forming Black Matrix>

A carbon black dispersion liquid is prepared by mixing 20 parts by weight of a carbon pigment, 8.3 parts by weight of a polymer dispersant, 1.0 parts by weight of a copper phthalocyanine derivative (manufactured by Toyo Ink Co., Ltd.), and 71 parts by weight of propylene glycol monomethyl ether acetate, and stirring the mixture with a bead mill dispersing machine.

<Photoresist for Forming Black Matrix>

As the materials for a resist for forming a black matrix, for example, a carbon black dispersion liquid, a resin (solids content: 56.1 wt %), a monomer, an initiator, a solvent (propylene glycol monomethyl ether acetate or ethyl 3-ethoxypropionate), and a leveling agent are used. These materials are mixed and stirred at the following composition ratio, and the mixture is used in the resist for forming a black matrix (pigment concentration in the solids content: about 20%).

Carbon black dispersion liquid: 3.0 parts by weight
Resin: 1.4 parts by weight
Monomer: 0.3 parts by weight
Initiator: 0.67 parts by weight
Initiator: 0.17 parts by weight
Propylene glycol monomethyl ether acetate: 14 parts by weight
Ethyl 3-ethoxypropionate: 5.0 parts by weight
Leveling agent: 1.5 parts by weight
<Conditions for Forming Black Matrix 13>

In regard to the formation of the black matrix 13, first, the photoresist is spin coated on the transparent substrate 8 which is a glass plate, and the photoresist is dried, for example, at 100° C. for 3 minutes. Thus, a coating film having a film thickness of 1.9 μm is formed on the surface of the transparent substrate 8. Subsequently, the coating film on the transparent substrate 8 is irradiated with light from a light source by using a photomask for exposure having a predetermined pattern width (corresponding to the streak width of the black matrix 13) and an opening pattern. The light is irradiated, for example, at a dose of 200 mJ/cm$^2$ by using an ultra-high pressure mercury lamp. Subsequently, the substrate after light irradiation was subjected to development, for example, for 60 seconds by using a 2.5% aqueous solution of sodium carbonate, and was washed with water and dried. The substrate was heat treated at 230° C. to 60 minutes, and thus the pattern is fixed. Thereby, a black matrix 13 is formed on the transparent substrate 8. Regarding the streak width of the black matrix 13, for example, a width of about 20 μm or about 20.5 μm is used. The black matrix 13 is formed around the pixels or sub-pixels.

For example, the angle of inclination from the surface of the transparent substrate 8 to the streak end which is the pattern edge, is set to about 45°.

[Formation of Transparent Resin Layer 2]

A transparent resin layer 2 is formed so as to cover the black matrix 13 and the openings where there is no black matrix 13, by using an alkali-soluble acrylic photosensitive resin coating liquid. The transparent resin layer 2 is formed such that the film thickness after film curing is, for example, about 1 μm. Through the formation of this transparent resin layer 2, a counter substrate 3 for liquid crystal display is formed.

Meanwhile, the substrate 3 of the present embodiment can be applied to a liquid crystal display device in which a color filter 18 is formed on the side of the array substrate 4, or a field sequential color liquid crystal display device (a technique of performing color display without a color filter by time sharing light source driving by using an LED light source of plural colors as the backlight).

As the acrylic photosensitive resin coating liquid, for example, a transparent resin coating liquid obtainable by synthesizing an acrylic resin, adding a monomer and a photoinitiator, and performing filtration through a pore size of, for example, 0.5 μm, can be used.

<Synthesis of Acrylic Resin>

In regard to the synthesis of the acrylic resin, first, 800 parts of cyclohexanone are introduced into the reaction container, and cyclohexanone is heated while nitrogen gas is injected into the reaction container. The following mixture of a monomer and a thermal polymerization initiator is added dropwise thereto, and thereby a synthesis reaction is carried out.

Styrene: 55 parts
Methacrylic acid: 65 parts
Methyl methacrylate: 65 parts
Benzyl methacrylate: 60 parts
Thermal polymerization initiator: 15 parts
Chain transfer agent: 3 parts Heating is sufficiently carried out after the dropwise addition, and thereafter, a material obtained by dissolving 2.0 parts of the thermal polymerization initiator in 50 parts of cyclohexanone is added to this mixture. The reaction is further continued, and thereby a solution of an acrylic resin is obtained.

To this resin solution, cyclohexanone is added such that the solids content is 30% by weight to prepare an acrylic resin solution, and thus, a resin solution (1) is obtained. The weight average molecular weight of the acrylic resin was about 20,000.

Furthermore, a mixture of the composition described below is uniformly stirred and mixed, and then is dispersed for a predetermined time (2 hours) with a sand mill by using, for example, glass beads having a diameter of 1 mm. Subsequently, the dispersion is filtered through a filter having a pore size of 0.5 μm, and thus a transparent resin coating liquid is obtained.

Resin solution (1): 100 parts by weight
Polyfunctional polymerizable monomer EO-modified bisphenol A methacrylate: 20 parts
Photoinitiator: 16 parts by weight
Cyclohexanone: 190 parts by weight Fifth Embodiment In the present embodiment, production of the counter substrate 17 shown in FIG. 12 will be described.

[Formation of Black Matrix 13]

A black matrix 13 is formed on a transparent substrate 8 which is an alkali-free glass plate, in the same pattern by using the photoresist for forming a black matrix described above.

[Formation of Color Filter (Color Pixel)]

<Dispersion Liquid for Forming Color Layer>

The following materials are used as the organic pigments to be dispersed in the color layer.

Pigments for red color
C.I. Pigment Red 254
C.I. Pigment Red 177
Pigments for green color
C.I. Pigment Green 58 (green pigment that will be described below)
C.I. Pigment Yellow 150
Pigments for blue color
C.I. Pigment Blue 15
C.I. Pigment Violet 23

Dispersion liquids of the respective colors of red, green and blue are prepared by using the pigments described above.

Red pigment dispersion liquid
Red pigment: C.I. Pigment Red 254: 18 parts by weight
Red pigment: C.I. Pigment Red 177: 2 parts by weight
Acrylic varnish (solids content 20 wt %): 108 parts by weight A mixture of the composition described above is uniformly stirred, and then the mixture is dispersed for a predetermined time (for example, 5 hours) with a sand mill by using glass beads. The dispersion is filtered through a filter (for example, a 5-μm filter), and thus a red pigment dispersion liquid is prepared.

Green pigment dispersion liquid
C.I. Pigment Green 58: 16 parts by weight
C.I. Pigment Yellow 150: 8 parts by weight
Acrylic varnish (solids content 20 wt %): 102 parts by weight A green pigment dispersion liquid can be prepared with a mixture of the composition described above by using the same preparation method as that used for the red pigment dispersion liquid.

Blue pigment dispersion liquid
C.I. Pigment Blue 15: 50 parts by weight
C.I. Pigment Violet 23: 2 parts by weight
Dispersant: 6 parts by weight
Acrylic varnish (solids content 20 wt %): 200 parts by weight A blue pigment dispersion liquid can be prepared with a mixture of the composition described above, by using the same preparation method as that used for the red pigment dispersion liquid.

[Color Pixel-Forming Color Resist]

Red pixel-forming color resist
Red dispersion liquid: 150 parts by weight
Trimethylolpropane triacrylate: 13 parts by weight
Photoinitiator: 4 parts by weight
Sensitizer: 2 parts by weight
Solvent: cyclohexanone: 257 parts by weight A mixture of the composition described above is uniformly stirred and mixed, and then is filtered through a filter having a pore size of 5 μm. Thereby, a red pixel-forming color resist is obtained.

Green pixel-forming color resist
Green dispersion liquid: 126 parts by weight
Trimethylolpropane triacrylate: 14 parts by weight
Photoinitiator: 4 parts by weight
Sensitizer: 2 parts by weight
Cyclohexanone: 257 parts by weight A mixture of the composition described above is uniformly stirred and mixed, and then is filtered through a filter having a pore size of 5 μm. Thereby, a green pixel-forming color resist is obtained.

Blue pixel-forming color resist

The blue pixel-forming color resist is prepared by the same method as for the red pixel-forming color resist such that the composition would be the composition described below.

Blue dispersion liquid: 258 parts by weight
Trimethylolpropane triacrylate: 19 parts by weight
Photoinitiator: 4 parts by weight
Sensitizer: 2 parts by weight
Cyclohexanone: 214 parts by weight

[Preparation of Green Pigment]

In order to prepare a green pigment, for example, in a molten salt at 200° C. of 356 parts of aluminum chloride and 6 parts of sodium chloride, 46 parts of zinc phthalocyanine is dissolved, and the solution is cooled to 130° C. and stirred for one hour. Furthermore, the reaction temperature is increased to 180° C., and bromine is added dropwise thereto at a rate of 10 parts per hour for 10 hours. Thereafter, chlorine is introduced thereto at a rate of 0.8 parts per hour for 5 hours.

In the preparation of the green pigment, the reaction liquid thus obtained is slowly injected into 3200 parts of water, and then the mixture is filtered and washed with water. Thus, 107.8 parts of a crude halogenated zinc phthalocyanine pigment is obtained. For example, the average number of bromine atoms contained in a molecule of the crude halogenated zinc phthalocyanine pigment is 14.1, while the average number of chlorine atoms is 1.9.

For example, 120 parts of the crude halogenated zinc phthalocyanine pigment thus obtained, 160 parts of pulverized table salt, and 270 parts of ethylene glycol are introduced into a 1-gallon kneader made of stainless steel, and the mixture is kneaded for 12 hours at 70° C.

The mixture obtainable in this manner is introduced into 5000 parts of warm water, and the mixture is stirred for about one hour with a high speed mixer while heated to about 70° C. to be in a slurry form. Furthermore, the mixture in a slurry form is repeatedly subjected to filtration and water-washing, and thus the table salt and the solvent are removed. Thereafter, the mixture is dried for 24 hours at 80° C. Thereby, 117 parts of a salt milling-treated green pigment is obtained.

[Formation of Color Pixels]

A color layer is formed by using the color pixel-forming color resist obtained according to the method described above. The various conditions for the formation of the color layer as described below merely constitute an example, and other conditions may also be applied.

In the formation of a color layer, first, a color resist for forming a red pixel-forming color resist is applied on a glass substrate by spin coating such that the finished film thickness is 1.8 μm. The color resist is dried at 90° C. for 5 minutes, and then is irradiated with light from a high pressure mercury lamp at a dose of 300 mJ/cm$^2$ through a photomask for forming color pixels. The color resist is developed with an alkali developing solution for 60 seconds, and thus a red color pixel in a stripe form is obtained. Thereafter, the red filter 18r (red color pixel) is baked at 230° C. for 30 minutes. The pixel is produced such that the overlap between the BM areas and color areas is, for example, 8.0 μm.

The green pixel-forming resist is also applied similarly by spin coating such that the finished film thickness is 1.8 μm. After the resist is dried at 90° C. for 5 minutes, the resist is subjected to exposure and development through a photomask such that a pattern is formed at a position adjacent to the red pixels described above. Thereby, a green filter 18g (green pixels) is obtained.

A blue pixel-forming resist is also completed by the same technique as that used for the red and green resists, and a blue filter 18b that is adjacent to the red filter 18r and the green filter 18g is obtained at a film thickness of 1.8 µm. Thereby, a color filter having coloration of three colors, namely, red, green and blue, on the substrate 8 is obtained. Thereafter, the color filter is cured at 230° C. for 30 minutes.

[Formation of Transparent Resin Layer 2]

A transparent resin layer 2 having a film thickness after being cured of 1 µm is formed so as to cover the entirety of the color filter 18 of three colors, namely, red, green and blue, by using the acrylic photosensitive resin coating liquids. The transparent resin layer 2 is subjected to exposure and development, and then is cured at 230° C. for 30 minutes.

[Formation of Third Electrode 9]

In the formation of the third electrode 9, an ITO (a metal oxide thin film of indium and tin) is formed at a film thickness of 0.14 µm at room temperature, so as to cover the entire surface after the black matrix 13 is formed, by using a sputtering apparatus.

An ITO film is formed into a comb-shaped third electrode 9 having a width of the common electrode of 7 µm, by using a known photolithographic method. The third electrode 9 is heat treated at 230° C. for 30 minutes for annealing of the ITO film, after the pattern formation. Thereby, the counter substrate 17 is formed.

Meanwhile, in the present embodiment, a configuration in which the third electrode 9 is formed above the transparent resin layer 2 has been described; however, the third electrode 9 may be formed directly above the transparent substrate 8 such as a glass plate, or may also be formed between the color filter 18 and the transparent resin layer 2.

Sixth Embodiment

In the present embodiment, an example of a liquid crystal display device including the substrates 1 and 16 that have been explained in the first through sixth embodiments will be described.

FIG. 21 is a cross-sectional diagram illustrating an example of the configuration of the liquid crystal display device according to the present embodiment.

In this FIG. 21, an example of the case where a liquid crystal display device 100 includes the substrate 1 is illustrated, but the same also applies to the case of including the substrate 16.

The liquid crystal display device 100 is a transflective liquid crystal display device using a reflecting polarizing plate. Regarding the reflecting polarizing plate, for example, the reflecting polarizing plate described in Japanese Patent No. 4177398 can be used.

The substrate 1 includes the array substrate 4 in which an active element (TFT) is formed, as described in the first embodiment. The array substrate 4 includes comb-shaped first and second electrodes 6 and 7. The counter substrate 3 and the array substrate 4 are located to face each other, and are sealed with the liquid crystal layer 5 interposed therebetween. On the surface of the counter substrate 3 on the reverse side of the liquid crystal layer 5 (back surface), a retardation plate 21 and a polarizing plate 22 are disposed. Furthermore, on the surface of the array substrate 20 on the reverse side of the liquid crystal layer 5 (back surface), a polarizing plate 23, a light diffusing layer 24, a reflecting polarizing plate 25, a retardation plate (optically compensating layer) 26, a prism sheet 27, a light diffusing layer 28, a light guiding plate 29, and a light reflecting plate 30 are disposed in sequence. The light guiding plate 29 is provided with, for example, a light source 31 such as an LED. For the polarizing plates 22 and 23, for example, an arrangement such as a cross Nicol arrangement is used.

The light source 31 is preferably RGB individual light emitting elements, but when the control of individual RGB light emitting elements is not carried out in a field sequential manner, the light source may be a pseudo-white LED. Furthermore, a cold cathode ray tube or a fluorescent lamp, both of which are conventionally used for general purposes, may also be used as the light source 31. When RGB individual light emitting elements are employed as the light source 31, the respective light emission intensities can be individually adjusted for each color and each pixel. Thus, optimal color display can be achieved, and color display can be achieved without using a color filter and time sharing driving synchronized with the liquid crystals. Furthermore, the liquid crystal display device can also be applied to stereoscopic image display. In the liquid crystal display device 100, a local dimming method which is a technology of increasing the contrast by adjusting the brightness of the backlight at various areas of the display screen, may also be applied.

In the liquid crystal display device 100 according to the present embodiment described above, the alignment treatment of the counter substrate 3 and the array substrate 4 can be alleviated. Furthermore, in the liquid crystal display device 100, responsiveness of the liquid crystals can be improved. Also, disclination of the liquid crystals can be reduced by the configuration of the first through third electrodes 6, 7 and 9, and the liquid crystal display can be improved.

Meanwhile, the liquid crystal display device 100 may also include the counter substrate 17 including a configuration in which the transparent conductive film 2 is laminated so as to cover the effective display pixels of the color filter 18, similarly to the second embodiment. In the substrate 16 equipped with the color filter 18, the counter substrate 17 and the array substrate 4 in which the active element such as TFT is formed are sealed, and liquid crystals 11 having negative dielectric constant anisotropy are encapsulated between the counter substrate 17 and the array substrate 4. The substrate 16 can include a polarizing plate and a retardation plate on both surfaces. Thereby, color gradation display is enabled. On the surfaces of the counter substrate 17 and the array substrate 4, vertical alignment films may be formed in advance. The array substrate 4 in which the active element is formed includes comb-shaped or stripe-shaped first and second electrodes 6 and 7. FIG. 12 to FIG. 15 illustrate cross-sectional diagrams of the substrate 16 equipped with the color filter 18, but the vertically alignment film is not shown.

In the liquid crystal display device 100 according to the present embodiment, a rigorous alignment treatment (for example, an alignment treatment in plural directions for forming plural domains by setting the tilt angle to 89°) required for a liquid crystal display device of vertical alignment, such as MVA or VATN) is not needed. In the liquid crystal display device 100 according to the present embodiment, vertical alignment of almost 90° can be applied.

In the present embodiment described above, as a secondary effect, unlike the IPS (liquid crystals are driven by a transverse electric field) or FFS (liquid crystals are driven by an electric field occurring on the fringe of a comb-shaped electrode) mode, a liquid crystal display device which is not easily affected by an external electric field can be provided.

Meanwhile, the rectangular pixel of the liquid crystal display device 100 according to the present embodiment can be partitioned into ½ pixels or ¼ pixels that are axisymmetric or point-symmetric about the pixel center on the plane. A technology of applying a driving mode in which two or four TFT elements are formed in one pixel and different voltages are applied to the respective TFT elements, can be applied to various visual angle adjusting technologies and stereoscopic image display technologies.

What is claimed is:

1. A liquid crystal display device comprising:
an array substrate that comprises a comb-shaped first electrode, which is a pixel electrode, an insulating layer, and a comb-shaped second electrode arranged in this order, a first longitudinal direction of comb teeth of the comb-shaped first electrode and a second longitudinal direction of comb teeth of the comb-shaped second electrode being parallel to each other, and the array substrate being partitioned into pixel units or sub-pixel units; and
a counter substrate that faces the array substrate via a liquid crystal layer and comprises a comb-shaped third electrode, the first longitudinal direction and a third longitudinal direction of comb teeth of the comb-shaped third electrode being parallel to each other, and the counter substrate being partitioned into the pixel units or the sub-pixel units,
wherein the liquid crystal layer comprises liquid crystals that have negative dielectric constant anisotropy, and are vertically aligned in an initial state,
in a cross-section perpendicular to the first through third longitudinal directions and parallel to a thickness direction of the liquid crystal layer, the first comb-shaped electrode and the third comb-shaped electrode are disposed in a state of facing one another via the liquid crystal layer, and the first through third comb-shaped electrodes are formed at respective positions symmetrical about a central axis in a cross-sectional view of the pixel or the sub-pixel,
a position of the comb teeth of the second comb-shaped electrode disposed nearest to the comb teeth of the first comb-shaped electrode is shifted from a position of the comb teeth of the first comb-shaped electrode in a first direction being parallel to surfaces of the array and counter substrates from the central axis,
a position of the comb teeth of the third comb-shaped electrode disposed nearest to the comb teeth of the first comb-shaped electrode is shifted from a position of the comb teeth of the first comb-shaped electrode in a second direction that is opposite to the first direction from the central axis, and
the comb teeth of the comb-shaped second electrode facing to the comb teeth of the first comb-shaped electrode via the insulating layer comprises a protruding width that protrudes in the first direction from the comb teeth of the first comb-shaped electrode, and the comb teeth of the first comb-shaped electrode and the comb teeth of the second comb-shaped electrode comprise overlapping widths that overlap with each other.

2. The liquid crystal display device according to claim 1, wherein the counter substrate comprises a black matrix having openings that transmit light in a direction perpendicular to the substrate plane, and a color filter formed at the openings.

3. The liquid crystal display device according to claim 1, wherein a plurality of pixels or a plurality of sub-pixels have a shape in which opposite sides are parallel to each other in a plane and the plurality of pixels or the plurality of sub-pixels formed on the array substrate and the counter substrate.

4. The liquid crystal display device according to claim 3, wherein each of the plurality of pixels or the plurality of sub-pixels is divided into four division regions in the plane, and
the comb-shaped first electrode, the comb-shaped second electrode, and the comb-shaped third electrode have longitudinal directions of the comb teeth that are parallel to any side of the division region in every division region in the plane, while the longitudinal directions of the comb teeth are different between the adjoining division regions.

5. The liquid crystal display device according to claim 3, wherein each of the plurality of pixels or the plurality of sub-pixels is divided into four division regions in the plane, and
the comb-shaped first electrode, the comb-shaped second electrode, and the comb-shaped third electrode have longitudinal directions of the comb teeth that are symmetric on two center lines in both a horizontal direction and a vertical direction which pass about a center point of the plurality pixels or the plurality of sub-pixels in the plane, provided in each of the four division regions, and have an angle of inclination with respect to each side of the division region.

6. The liquid crystal display device according to claim 1, wherein the number of the comb teeth of the comb-shaped third electrode in the pixel unit or the sub-pixel unit is larger than the number of the comb teeth of the comb-shaped first electrode.

7. The liquid crystal display device according to claim 1, wherein the comb-shaped first electrode, the comb-shaped second electrode, and the comb-shaped third electrode are each formed by a conductive film transparent to a visible light region.

8. The liquid crystal display device according to claim 1, wherein the number of the comb teeth of the comb-shaped third electrode is an even number of 2 or more in the pixel unit or the sub-pixel unit.

9. The liquid crystal display device according to claim 1, wherein the number of the comb teeth of the comb-shaped first electrode is an even number of 2 or more in the pixel unit or the sub-pixel unit, the number of the comb teeth of the comb-shaped second electrode is an even number of 2 or more in the pixel unit or the sub-pixel unit.

10. The liquid crystal display device according to claim 1 wherein the protruding width is set to 0.5 μm to 6 μm.

* * * * *

UNITED STATES PATENT AND TRADEMARK OFFICE
CERTIFICATE OF CORRECTION

| | | |
|---|---|---|
| PATENT NO. | : 9,097,954 B2 | Page 1 of 1 |
| APPLICATION NO. | : 13/912958 | |
| DATED | : August 4, 2015 | |
| INVENTOR(S) | : Taro Sakamoto et al. | |

It is certified that error appears in the above-identified patent and that said Letters Patent is hereby corrected as shown below:

On the title page item (56), Column 2, OTHER PUBLICATIONS, Line 1

After "of" delete "JP" ($1^{st}$ occurrence).

In the claims,

Claim 5, Column 32, Line 30 (Approximately)

Delete "plurality pixels" and insert --plurality of pixels--, therefor.

Claim 10, Column 32, Line 54

Delete "claim 1" and insert --claim 1,--, therefor.

Signed and Sealed this
Twenty-fourth Day of November, 2015

Michelle K. Lee
*Director of the United States Patent and Trademark Office*